(12) United States Patent
Ideuchi et al.

(10) Patent No.: US 11,394,956 B2
(45) Date of Patent: Jul. 19, 2022

(54) ENCODING APPARATUS AND ENCODING METHOD

(71) Applicant: FUJITSU LIMITED, Kawasaki (JP)

(72) Inventors: Masao Ideuchi, Hachioji (JP);
Masahiro Kataoka, Kamakura (JP);
Kosuke Tao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 16/899,634

(22) Filed: Jun. 12, 2020

(65) Prior Publication Data
US 2020/0304779 A1     Sep. 24, 2020

Related U.S. Application Data

(63) Continuation of application No. 15/000,784, filed on Jan. 19, 2016, now abandoned.

(30) Foreign Application Priority Data

Jan. 21, 2015   (JP) ................................ 2015-009833

(51) Int. Cl.
*H04N 19/00*   (2014.01)
*G06F 40/12*   (2020.01)

(52) U.S. Cl.
CPC ............. *H04N 19/00* (2013.01); *G06F 40/12* (2020.01)

(58) Field of Classification Search
None
See application file for complete search history.

(56) References Cited

U.S. PATENT DOCUMENTS

| | | | |
|---|---|---|---|
| 4,899,148 A | 2/1990 | Kawabe et al. |
| 5,893,102 A | 4/1999 | Maimone et al. |
| 6,529,912 B2 | 3/2003 | Satoh et al. |
| 7,365,658 B2 | 4/2008 | Todorov et al. |
| 8,595,196 B2 | 11/2013 | Kataoka et al. |
| 2002/0033762 A1 | 3/2002 | Belu |

(Continued)

FOREIGN PATENT DOCUMENTS

| | | |
|---|---|---|
| JP | H09-319766 A | 12/1997 |
| JP | H11-85790 A | 3/1999 |

(Continued)

OTHER PUBLICATIONS

Japanese Office Action dated Oct. 2, 2018 for corresponding Japanese Patent Application No. 2015-009833, with English Translation (4 pages).

(Continued)

*Primary Examiner* — Jiangeng Sun
(74) *Attorney, Agent, or Firm* — Fujitsu Patent Center

(57) ABSTRACT

An information processing device encodes a plurality of documents into a first plurality of encoded documents, respectively based on first encoding information in which a plurality of words and a plurality of first codes of a first code group are associated, words included in the plurality of documents and included in the first encoding information being encoded in the plurality of encoded documents. The information processing device performs frequency counts for each of a plurality of codes in the first encoded documents encoded in the first encoding. The information processing device encodes the plurality of first encoded documents into a plurality of second encoded documents respectively, utilizing a result of the frequency counts.

5 Claims, 22 Drawing Sheets

(56) References Cited

U.S. PATENT DOCUMENTS

| | | |
|---|---|---|
| 2002/0063641 A1 | 5/2002 | Fish |
| 2002/0065822 A1 | 5/2002 | Itani |
| 2007/0273564 A1 | 11/2007 | Morel |
| 2008/0098024 A1 | 4/2008 | Kataoka et al. |
| 2010/0057439 A1 | 3/2010 | Ideuchi et al. |
| 2013/0086086 A1 | 4/2013 | Kataoka |
| 2013/0117576 A1 | 5/2013 | Kataoka et al. |
| 2013/0238865 A1 | 9/2013 | Kataoka et al. |
| 2013/0297575 A1 | 11/2013 | Fallon et al. |
| 2014/0236993 A1 | 8/2014 | Kataoka et al. |
| 2016/0197621 A1 | 7/2016 | Hong et al. |

FOREIGN PATENT DOCUMENTS

| | | |
|---|---|---|
| JP | H11-168390 A | 6/1999 |
| JP | 2008-257474 A | 10/2008 |

OTHER PUBLICATIONS

U. Khurana and A. Koul, "Text Compression and Superfast Searching", Thapar Institute of Engineering and Technology, Patiala, Punjab, India—147004. arXiv:cs/0505056v1, ay 2005 (Office Action dated Jun. 15, 2018)).

USPTO ,(Jiangeng) Final Office Action, dated Mar. 12, 2020, in parent U.S. Appl. No. 15/000,784 [pending].

USPTO ,(Jiangeng) Examiner's Answer to Appeal Brief, dated Nov. 4, 2019, in parent U.S. Appl. No. 15/000,784 [pending].

USPTO ,(Jiangeng) Notice of Panel Decision from Pre-Appeal Brief Review, dated Apr. 23, 2019, in parent U.S. Appl. No. 15/000,784 [pending].

USPTO ,(Jiangeng) Final Office Action, dated Jan. 9, 2019, in parent U.S. Appl. No. 15/000,784 [pending].

USPTO ,(Jiangeng) Non-Final Office Action, dated Jun. 15, 2018, in parent U.S. Appl. No. 15/000,784 [pending].

USPTO ,(Jiangeng) Final Office Action, dated Dec. 12, 2017, in parent U.S. Appl. No. 15/000,784 [pending].

USPTO ,(Jiangeng) Non-Final Office Action, dated Jun. 12, 2017, in parent U.S. Appl. No. 15/000,784 [pending].

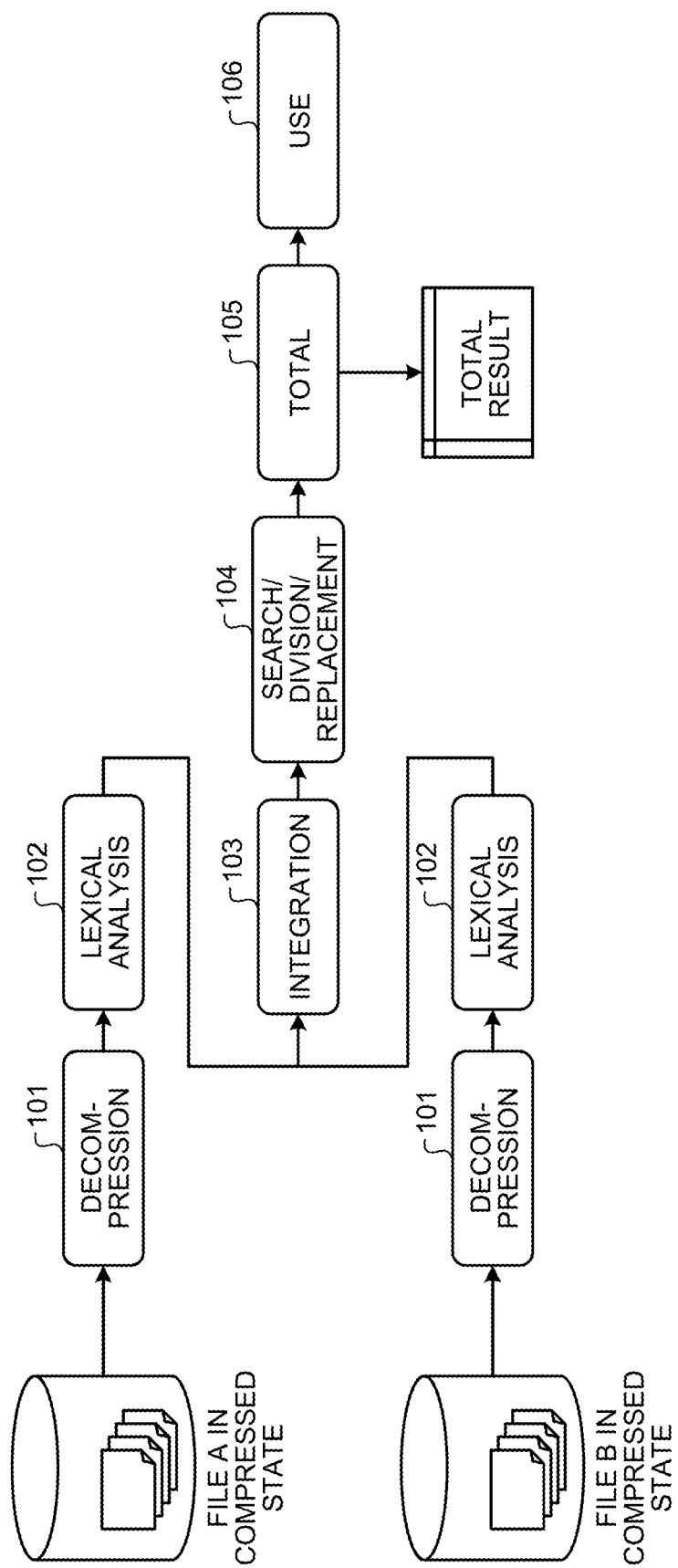

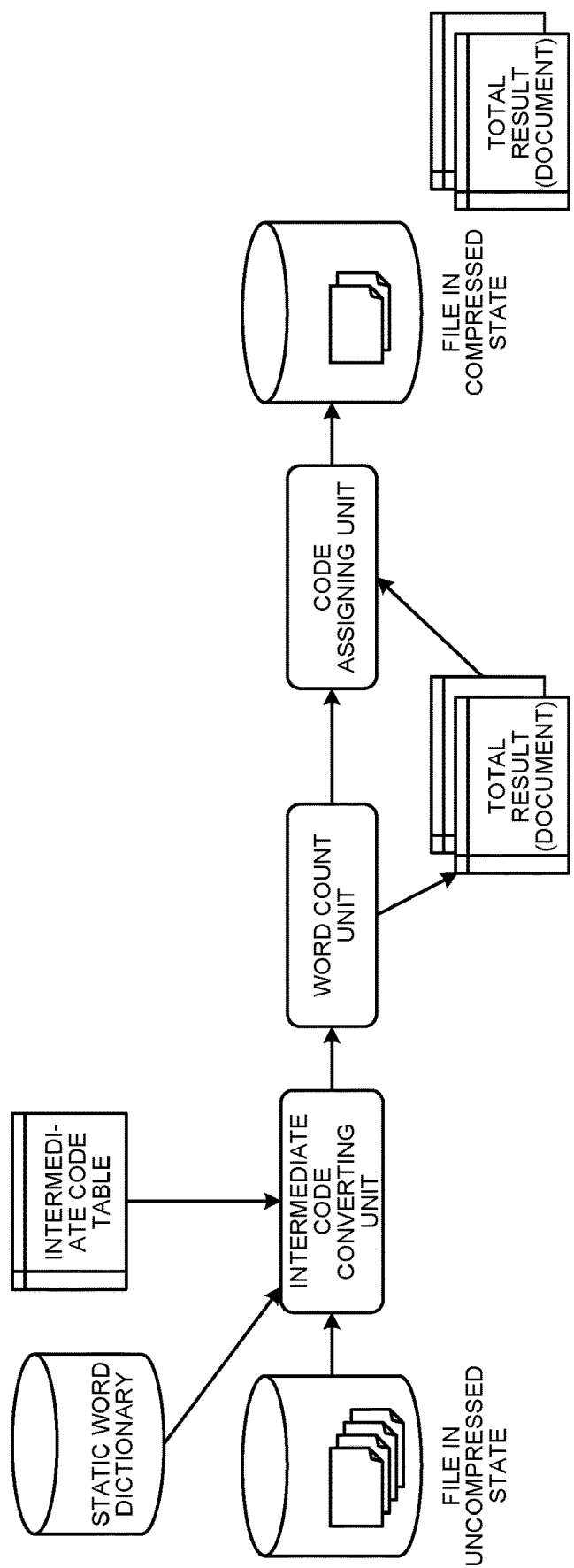

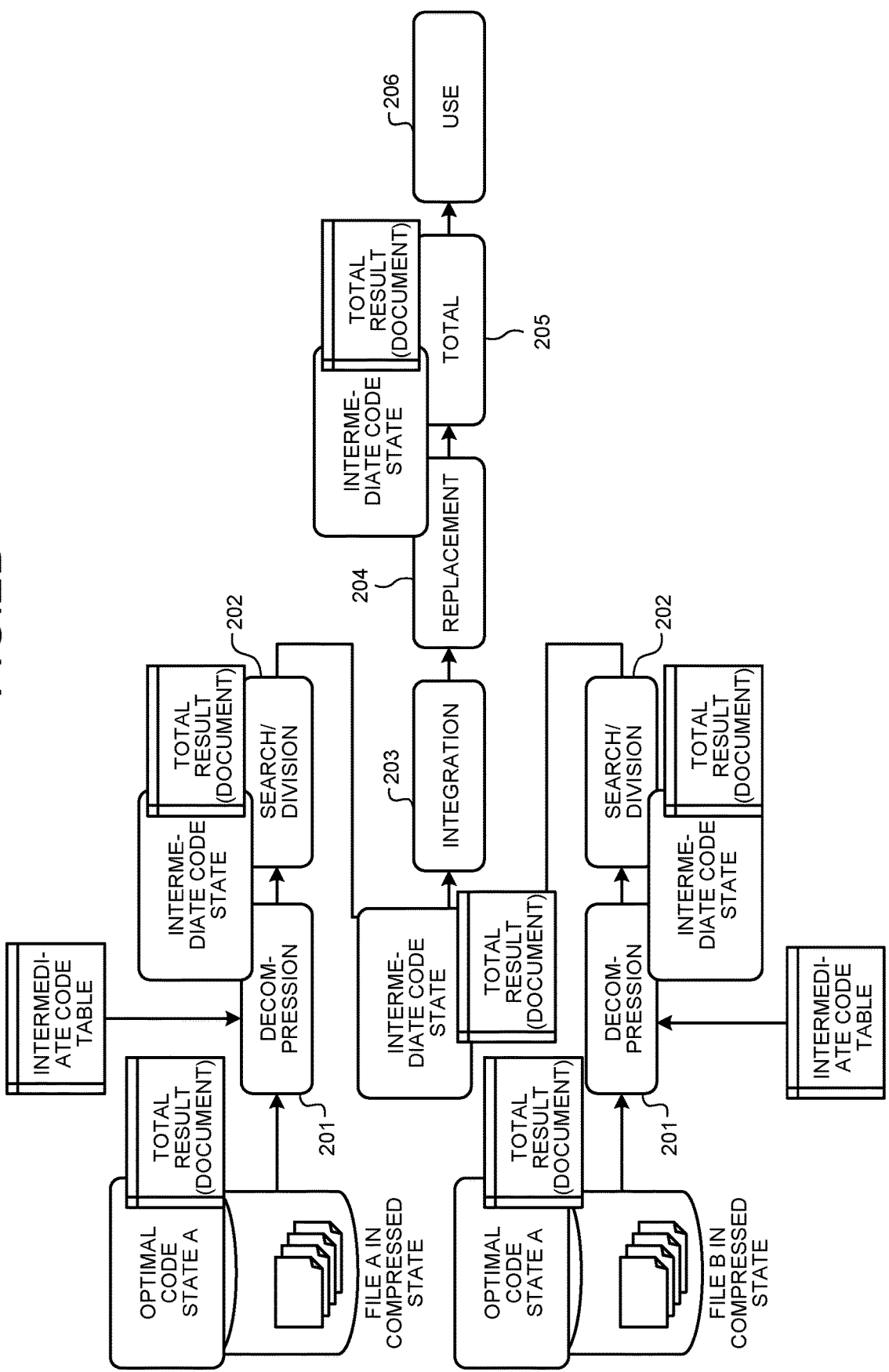

FIG.7

| DOCUMENT NUMBER | さくら (cherry blossoms) | かえで (maple) | 学校 (school) | の (of) | ... |
|---|---|---|---|---|---|
| 1 | 1 | 0 | 1 | 1 | ... |
| 2 | 0 | 1 | 1 | 1 | ... |
| ⋮ | ⋮ | ⋮ | ⋮ | ⋮ | ... |
| ⋮ | ⋮ | ⋮ | ⋮ | ⋮ | ⋮ |

FIG.8

| WORD ID | OPTIMAL CODE (DYNAMIC) |
|---|---|
| 1 | 010⋯011 |
| 2 | 010⋯111 |
| 3 | 011⋯01 |
| ⋮ | ⋮ |
| ⋮ | ⋮ |

ENCODING APPARATUS AND ENCODING METHOD

CROSS-REFERENCE TO RELATED APPLICATION(S)

This application is a continuation of application Ser. No. 15/000,784, filed Jan. 19, 2016, which is based upon and claims the benefit of priority of the prior Japanese Patent Application No. 2015-009833, filed on Jan. 21, 2015, the entire contents of which are incorporated herein by reference.

FIELD

The embodiments discussed herein are directed to a computer-readable recording medium having stored therein a document processing program, and the like.

BACKGROUND

When performing a search over a plurality of documents, a device that performs a search needs to use index information generated in each document or needs to perform a search after all the documents are decompressed.

Particularly, when each document is compressed, the compression is not always performed on each word, and even if the compression is performed on each word, a compression code corresponding to the word is different from each other in each document. Therefore, when performing a search over the documents, the device needs to perform a search after all the documents are decompressed.

A compression algorism includes ZIP based on LZ77. ZIP determines a longest-match string for a compression target character string using a sliding window and generates compressed data. Therefore, because the compression is not performed on each word, the device has to perform a search after all the documents are decompressed when performing the search over the documents.

As another compression algorism, there is a technology of counting the number of appearances of a word in a compression target document and assigning a variable-length code to the word according to the number of appearances (see, for example, Japanese Laid-open Patent Publication No. 11-168390). In this technology, a total result of lexical analysis obtained by counting the number of appearances for each word is used to generate the compressed data. When there is a plurality of documents, a code assigned to a word becomes different in each of the documents, and, therefore, when performing a search over the documents, a device needs to perform a search after all the documents are decompressed.

However, when the processing such as a search over the documents is to be performed, there is a problem that the total result of the documents generated at the time of compression is not able to be used.

For example, for compression processing in the ZIP, because the longest-match string is determined using the sliding window, as a compression code generated from the longest-match string, a code is not intended to separate words. In other words, there is no commonality between the compression processing and the search processing of words. Therefore, when the processing such as a search over the documents is to be performed, total results of the documents generated at the time of compression are not able to be used.

Even in a case of the compression algorism using the number of appearances, a word dictionary used for compression is independent for each document because a word appearing in a document before being encoded and part-of-speech information for the word are registered as category information in the word dictionary. The compression processing is implemented by using a word dictionary corresponding to a document to divide the document into words and generate a total result as a result of counting the divided words. The generated total result is independent in each of the documents. Therefore, when the processing such as a search over the documents is to be performed, the total results of the documents generated at the time of compression are not able to be used.

In the compression algorism using the number of appearances, the problem that the total results generated at the time of compression are not able to be used when the processing such as a search over the documents is to be performed will be explained below with reference to FIG. 1A and FIG. 1B. FIG. 1A is a diagram of an example of compression processing. As illustrated in FIG. 1A, a word count unit divides a file in an uncompressed state into words by using a word dictionary corresponding to the file. The word count unit counts the divided words and generates a total result as a result of counting the words. The total result is generated file by file. A code assigning unit assigns a compression code to a word using the total result. Thus, a file in a compressed state is generated. The total result is deleted after the file in the compressed state is generated. This is because the total result is generated from the word dictionary different for each file and there is no commonality between the files.

FIG. 1B is a diagram of an example of document processing using a file in a compressed state. As illustrated in FIG. 18, the document processing decompresses a file A in a compressed state (101) and performs lexical analysis on the decompressed file in the uncompressed state (102). The lexical analysis mentioned here indicates that the data in the file in the uncompressed state is divided into words. The document processing also decompresses a file B in a compressed state (101) and performs lexical analysis on the decompressed file in the uncompressed state (102). The document processing integrates the lexically analyzed files A and B in the uncompressed state (103). The document processing then performs the processing such as a search over a plurality of files (104). For example, when the processing is search processing, the document processing extracts a document that matches the search processing. The document processing then totals extracted documents and generates a new total result different from the total result generated at the time of compression (105). The document processing uses the generated total result i.e. the file in the compressed state (106). In other words, in the document processing, when the processing such as a search over the files is performed, it is not possible to use a plurality of total results generated at the time of compression.

SUMMARY

According to an aspect of an embodiment, a non-transitory computer-readable recording medium stores therein an encoding program. The encoding program causes a computer to execute a process. The process includes encoding a plurality of documents into a first plurality of encoded documents, respectively based on first encoding information in which a plurality of words and a plurality of first codes of a first code group are associated, words included in the plurality of documents and included in the first encoding information being encoded in the plurality of encoded documents. The process includes performing frequency counts for each of a plurality of codes in the first encoded documents encoded in the first encoding. The process includes encoding the plurality of first encoded documents into a plurality of second encoded documents respectively, utilizing a result of the frequency counts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B is a diagram of an example of document processing using a file in a compressed state;

FIG. 2A is a diagram of an example of compression processing according to an embodiment;

FIG. 2B is a diagram of an example of document processing according to the embodiment;

FIG. 7 is a diagram of an example of a data structure of total information according to the embodiment;

FIG. 8 is a diagram of an example of a data structure of an optimal code table according to the embodiment;

DESCRIPTION OF EMBODIMENTS

Figure 1A:
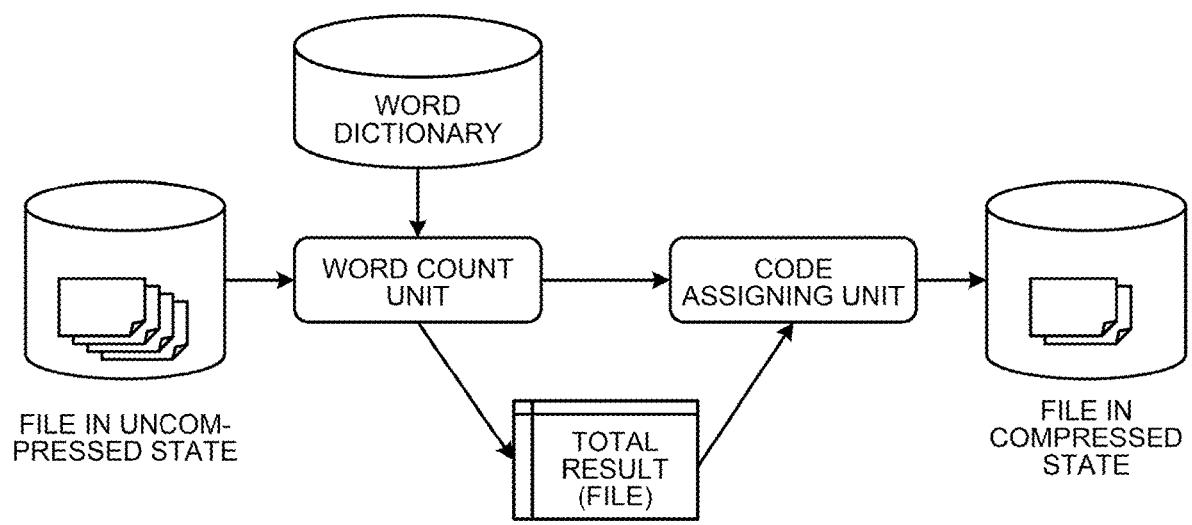
FIG. 1A is a diagram of an example of compression processing.

Preferred embodiments of the present invention will be explained with reference to accompanying drawings. It is noted that the present invention is not limited by the embodiments.

FIG. 2A is a diagram of an example of compression 10 processing according to the present embodiment.

As illustrated in FIG. 2A, an intermediate code converting unit divides a file in an uncompressed state into words by using the static word dictionary. The intermediate code converting unit performs an intermediate encoding on the divided words based on the intermediate code table. The static word dictionary is a static dictionary in which a word appearing in a document is associated with a part of speech based on general language dictionaries and textbooks, etc. The intermediate code table is information in which a word is associated with an intermediate code. The intermediate code is a code functioning as an intermediate used when a word is encoded to an optimal compression code, and a code of a fixed length is assigned to the word. The fixed length is, for example, 3 bytes.

The word count unit counts, for each of the documents included in a file, the number of appearances for each intermediate code corresponding to the word generated through intermediate encoding. The word count unit generates a total result as a result of counting the number of appearances for each intermediate code. In other words, the total result is a result of frequency counts of each intermediate code and is generated document by document.

The code assigning unit optimally encodes each of the intermediate encoded documents using the total result of each of the documents. For example, the code assigning unit generates integrated total information obtained by merging the total results of the documents, and performs optimal encoding in which each of the intermediate encoded documents is encoded to an optimal compression code based on the generated integrated total information. Consequently, the file in the compressed state is generated.

FIG. 2B is a diagram of an example of document processing according to the embodiment.

As illustrated in FIG. 2B, the file A in the compressed state and the total result of each document generated during the compression processing are present. The file B in the compressed state and the total result of each document generated during the compression processing are present.

The document processing decompresses the file A in the compressed state by performing an intermediate encoding on each of the optimally encoded documents based on the intermediate code table (201). That is, the document processing sets the documents to be in an intermediate code state indicating a state in which the documents are encoded using intermediate codes. When there is a search keyword, the document processing searches for a document including the search keyword from the documents in the intermediate code state (202). For example, when receiving the search keyword, the document processing determines the document including the search keyword from the documents in the intermediate code state based on the total results of the documents generated during the compression processing. The document processing sets the intermediate code state corresponding to the determined document as a search target.

The document processing decompresses the file B in the compressed state by performing an intermediate encoding on each of the optimally encoded documents based on the intermediate code table (201). That is, the document processing sets the documents to be in an intermediate code state indicating a state in which the documents are encoded using intermediate codes. When there is a search keyword, the document processing searches for a document including the search keyword from the documents in the intermediate code state (202). For example, when receiving the search keyword, the document processing determines the document including the search keyword from the documents in the intermediate code state based on the total results of the documents generated during the compression processing. The document processing sets the intermediate code state corresponding to the determined document as a search target.

The document processing integrates the intermediate code states corresponding to the search target documents respectively corresponding to the file A and the file B (203). The document processing then extracts a total result of the search target document.

When replacement of a predetermined keyword is desired, the document processing replaces the documents in the integrated intermediate code state with the predetermined keywords (204). For example, when receiving a first keyword before replacement and a second keyword after replacement, the document processing determines a document in the intermediate code state including an intermediate code of the first keyword based on the total results of the documents generated during the compression processing. The document processing replaces the intermediate code of the first keyword in the intermediate code state corresponding to the determined document with the intermediate code of the second keyword.

The document processing totals the intermediate code states of the documents as a result of the processing and generates a new total result (205). The document processing uses the generated total result, i.e., the file in the compressed state (206).

Thus, the document processing can use the total result generated during the compression when the processing such as a search over the files. Moreover, by performing the processing such as a search and the processing such as an integration over the documents in the intermediate code state, the document processing can reduce the load of input-output (I/O) to the extent that at least a lexical analysis 102 is not performed, as compared with the processing performed in the uncompressed state of the decompressed document, so that the processing can be speeded up.

Figure 3:
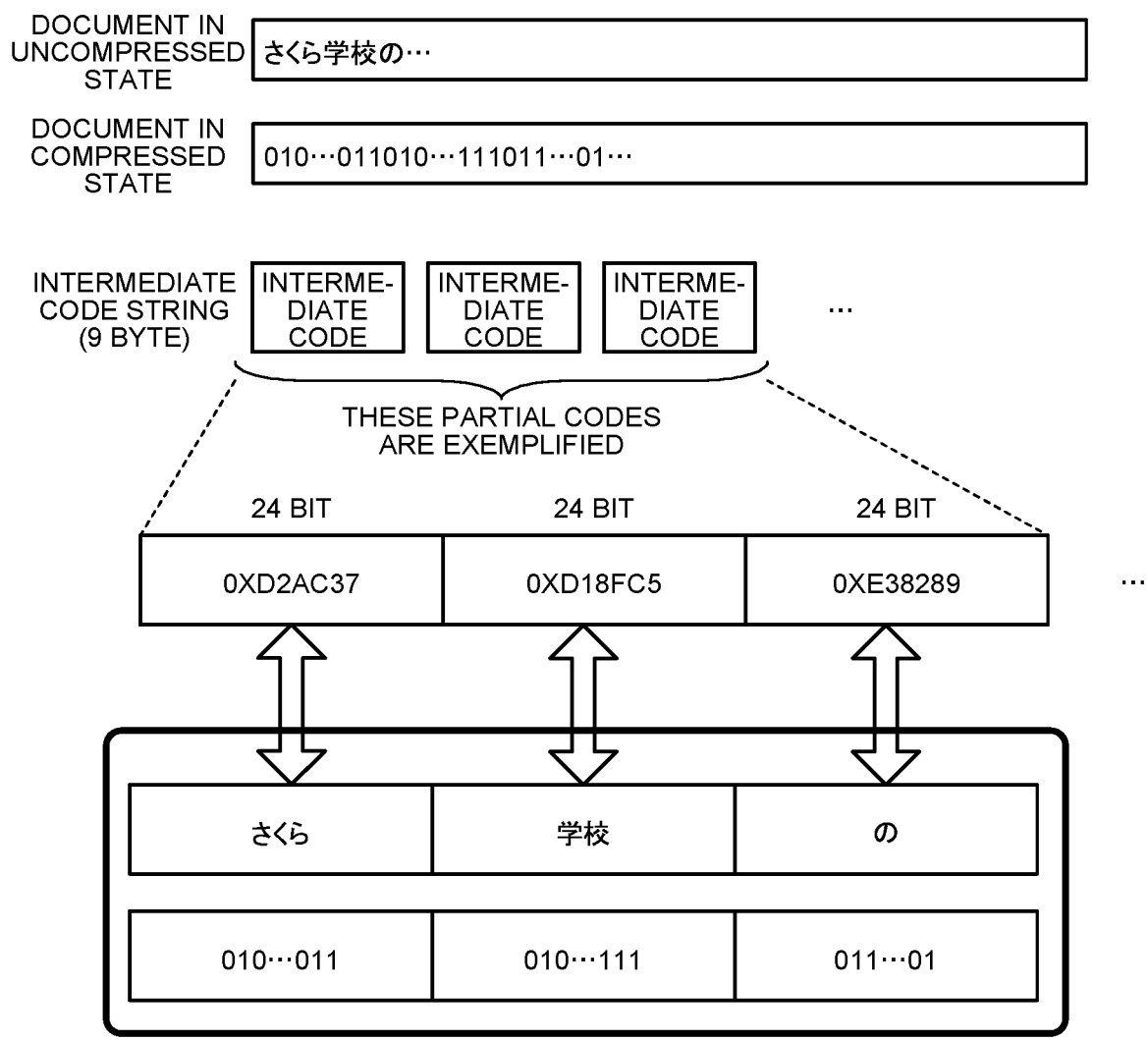
FIG. 3 is a diagram for explaining an intermediate code.

FIG. 3 is a diagram for explaining the intermediate code. The intermediate code table is assumed that a word "さくら" is associated with an intermediate code "0xD2AC37", a word "学校" is associated with an intermediate code "0xD18FC5", and a word "の" is associated with an intermediate code "0xE38289".

In the compression processing, the intermediate code converting unit divides a document in an uncompressed state into words, and performs an intermediate encoding on the divided words based on the intermediate code table. In the example of FIG. 3, "さくら 学校 の . . . " is set as the document in the uncompressed state. The intermediate code converting unit divides the document in the uncompressed state into words: "さくら", "学校", "の" . . . . The intermediate code converting unit associates the word "さくら" with the intermediate code "0xD2AC37" based on the intermediate code table. The intermediate code converting unit associates the word "学校" with the intermediate code "0xD18FC5". The intermediate code converting unit associates the word "の" with the intermediate code "0xE38289". The intermediate code converting unit then converts the document in the uncompressed state "さくら 学校 の . . . " into an intermediate code state "0xD2AC37 0xD18FC5 0xE38289".

In the document processing, by performing an intermediate coding on each of optimally encoded documents based on the intermediate code table, the documents are decompressed. In the example of FIG. 3, it is assumed that the word "さくら" is associated with a compression code (optimal code) "010 . . . 011", the word "学校" is associated with a compression code "010 . . . 111", and the word "の" is associated with a compression code "011 . . . 01". As a document in the compressed state, "010 . . . 101010 . . . 111011 . . . 01 . . . " is set. The document in the compressed state indicates a compressed state of the document in the uncompressed state. The document processing associates the optimal code "010 . . . 011" with the intermediate code "0xD2AC37". The document processing associates the optimal code "010 . . . 111" with the intermediate code "0xD18FC5". The document processing associates the optimal code "011 . . . 01" with the intermediate code "0xE38289". The document processing then decompresses the document in the compressed state by converting the document in the compressed state "010 . . . 011010 . . . 111011 . . . 01 . . . " into the intermediate code state "0xD2AC37 0xD18PC5 0xE38289".

Accordingly, an intermediate code of a fixed length is associated with a word, and, therefore, by performing intermediate encoding on the document, the intermediate converting unit can handle the intermediate code state of the intermediate encoded document as a lexical analysis result. Moreover, because the intermediate code of the fixed length is associated with the word, by making the document in the compressed state be in the intermediate code state, the document processing can handle the intermediate code state as a lexical analysis result even if the document in the compressed state is not fully decompressed. This is because each of the intermediate codes in the fixed length in the intermediate code state can be determined as a word.

Figure 4:
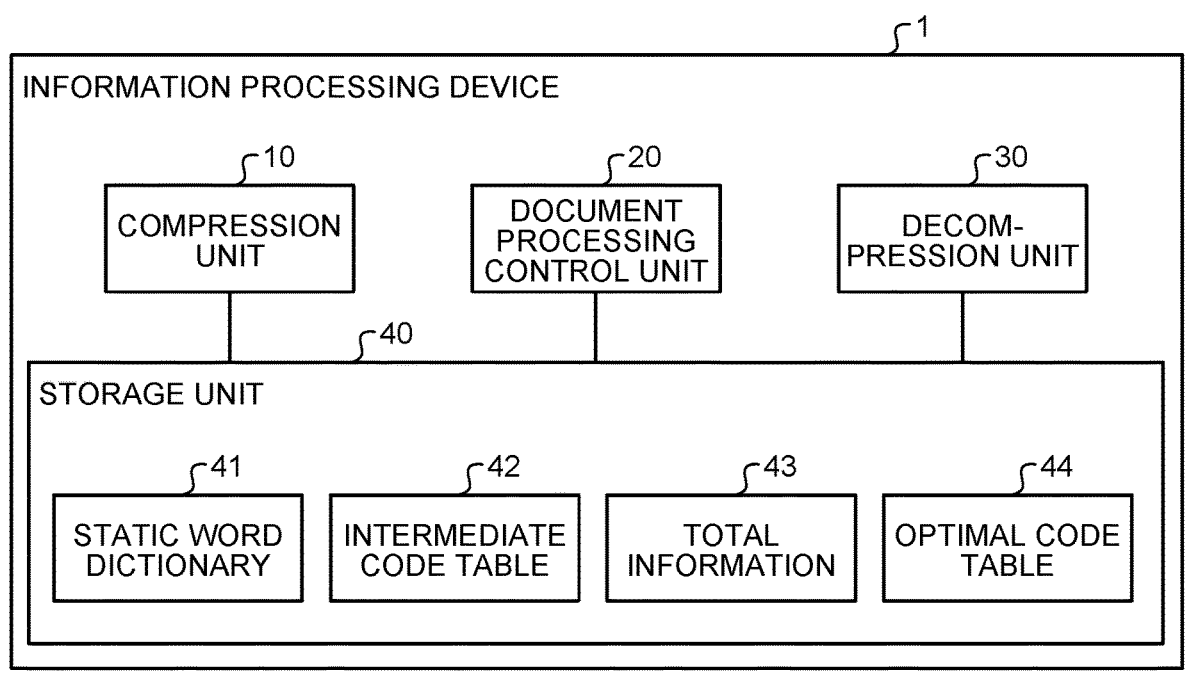
FIG. 4 is a functional block diagram of the configuration of an information processing device according to the embodiment.

FIG. 4 is a functional block diagram of the configuration of an information processing device according to the embodiment. As illustrated in FIG. 4, an information processing device 1 includes a compression unit 10, a document processing control unit 20, a decompression unit 30, and a storage unit 40.

The compression unit 10 is a processor that executes the compression processing illustrated in FIG. 2A. The document processing control unit 20 is a processor that executes the document processing illustrated in FIG. 2B. The decompression unit 30 is a processor that decompresses the data compressed by the compression unit 10.

The storage unit 40 corresponds to a storage device such as a nonvolatile semiconductor memory device including, for example, flash memory and Ferroelectric Random Access Memory (FRAM™). The storage unit 40 includes a static word dictionary 41, an intermediate code table 42, total information 43, and an optimal code table 44.

The static word dictionary 41 is a dictionary in which a word appearing in a document is associated with a part of speech based on general language dictionaries and textbooks, etc. The static word dictionary 41 is determined in advance. A data structure of the static word dictionary 41 will be explained below with reference to FIG. 5.

Figure 5:
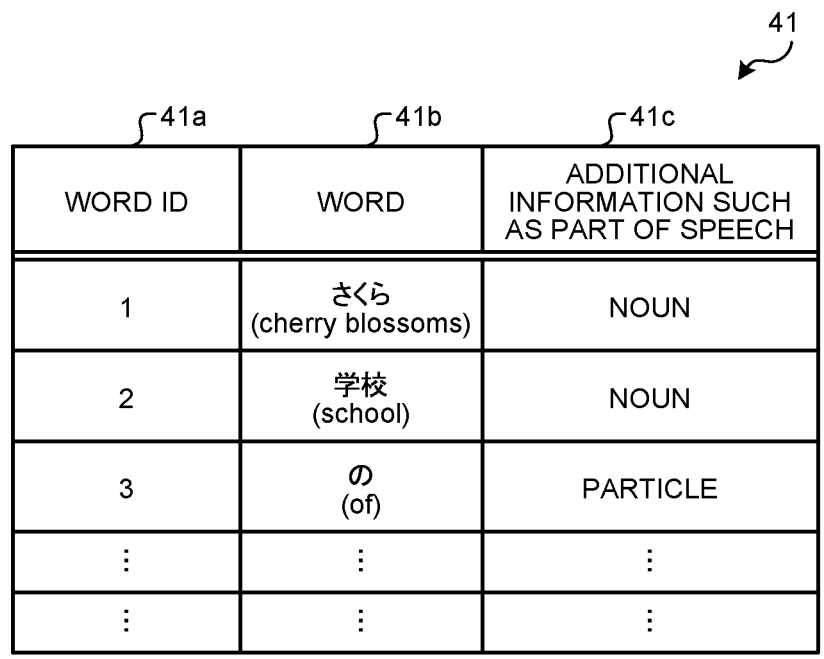
FIG. 5 is a diagram of an example of a data structure of a static word dictionary according to the embodiment.

FIG. 5 is a diagram of an example of a data structure of the static word dictionary according to the embodiment. As illustrated in FIG. 5, the static word dictionary 41 stores a word identification (ID) 41a, a word 41b, and additional information 41c such as part of speech, which are associated with each other. The word ID 41a represents an identifier of a word. The word 41b represents a word itself. The additional information 41c such as part of speech represents, for example, a part of speech of a word. As an example, when the word ID 41a is "1", the static word dictionary 41 stores "さくら" as the word 41b and "Noun" as the additional information 41c such as part of speech.

Returning to FIG. 4, the intermediate code table 42 is information in which a word is associated with an intermediate code. The intermediate code table 42 is static information and is determined in advance. A data structure of the intermediate code table 42 will be explained below with reference to FIG. 6.

Figure 6:
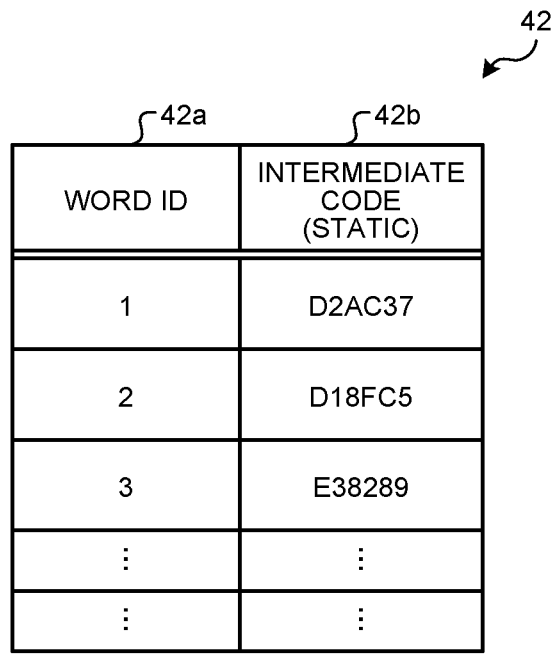
FIG. 6 is a diagram of an example of a data structure of an intermediate code table according to the embodiment.

FIG. 6 is a diagram of an example of a data structure of the intermediate code table according to the embodiment. As illustrated in FIG. 6, the intermediate code table 42 stores a word ID 42a and an intermediate code 42b in association with each other. The word ID 42a represents an identifier of a word. The word ID 42a is associated with the word ID 41a of the static word dictionary 41. The intermediate code 42b represents an intermediate code of the word corresponding to the word ID 42a. The intermediate code 42b is expressed by, for example, 3-byte fixed length. As an example, when the word ID 42a is "1", the intermediate code table 42 stores "D2AC37" as the intermediate code 42b. When the word ID 42a is "2", the intermediate code table 42 stores "D18FC5" as the intermediate code 42b.

Returning to FIG. 4, the total information 43 is information indicating the number of appearances of each word included in a document. The total information 43 is managed document by document. The total information 43 corresponds to the total results of FIG. 2A and FIG. 2B. A data structure of the total information 43 will be explained below with reference to FIG. 7.

FIG. 7 is a diagram of an example of a data structure of the total information according to the embodiment. As illustrated in FIG. 7, the total information 43 stores number of appearances 43c of a word 43b included in a document of each document number 43a. The number of a document is set to the document number 43a. A word included in the document is set to the word 43b. A word and an intermediate code corresponding to the word may be set to the word 43b. The number of appearances of the word 43b included in a document of the document number 43a is set to the number of appearances 43c. The number of appearances 43c is set to a position specified with the document number 43a and the word 43b. As an example, when the document number 43a is "1", the total information 43 stores "さくら" as the word 43b and "1" as the number of appearances 43c. When the document number 43a is "1", the かえで total information 43 stores "かえで" as the word 43b and "0" as the number of appearances 43c. When the document number 43a is "1", the total information 43 stores "学校" 学校 as the word 43b and "1" as the number of appearances 43c. When the document number 43a is "1", the total information 43 stores "の" as the word 43b and "1" as the number of appearances 43c.

Returning to FIG. 4, the optimal code table 44 is information in which a word is associated with an optimal compression code (hereinafter, the same as the optimal code). That is, the optimal code table 44 is information in which a shorter compression code is assigned to a word of a higher frequency of appearance based on the total information 43. The optimal code table 44 is dynamically generated by the compression unit 10 explained later. A data structure of the optimal code table 44 will be explained below with reference to FIG. 8.

FIG. 8 is a diagram of an example of a data structure of the optimal code table according to the embodiment. The optimal code table 44 stores a word ID 44a and an optimal code 44b in association with each other. The word ID 44a represents an identifier of a word. The word ID 44a is associated with the word ID 41a of the static word dictionary 41 and is also associated with the word ID 42a of the intermediate code table 42. The optimal code 44b represents an optimal code of the word corresponding to the word ID 42a. As an example, when the word ID 44a is "1", the optimal code table 44 stores "010 . . . 011" as the optimal code 44b.

Figure 9:
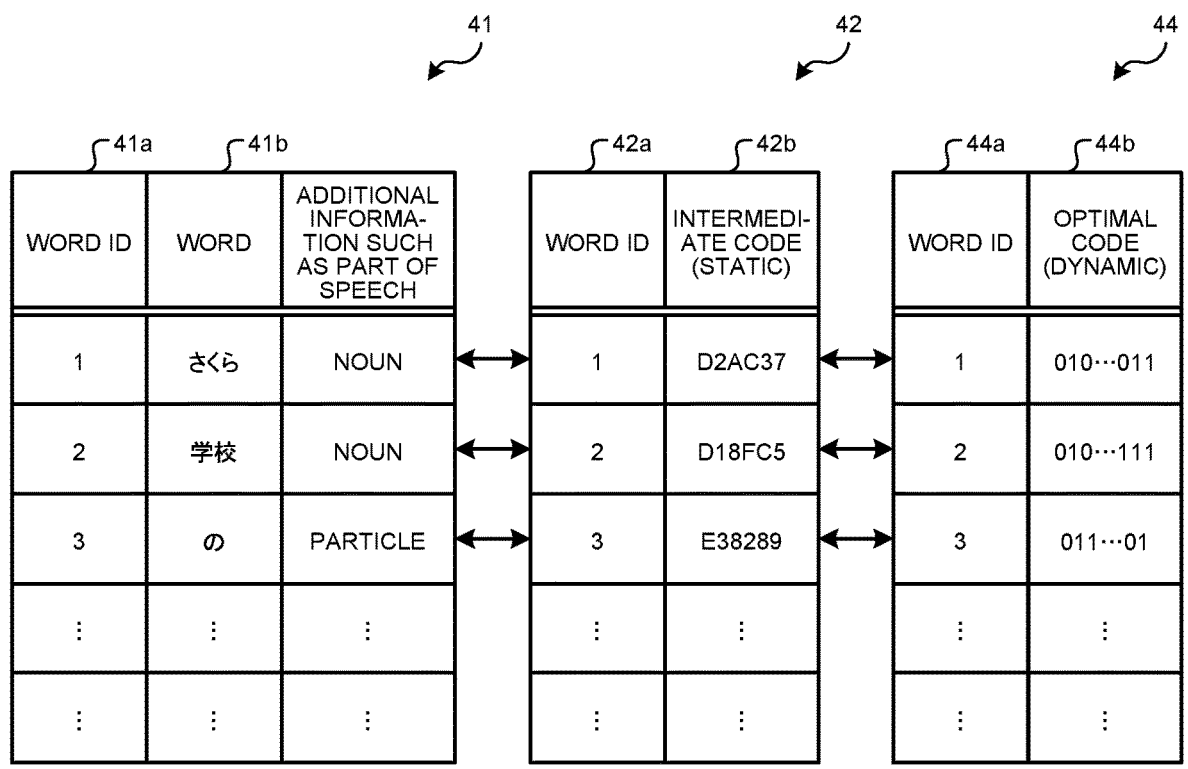
FIG. 9 is a diagram of a relationship between the static word dictionary, the intermediate code table, and the optimal code table.

FIG. 9 is a diagram of a relationship between the static word dictionary, the intermediate code table, and the optimal code table. As illustrated in FIG. 9, in the static word dictionary 41, the intermediate code table 42, and the optimal code table 44, the intermediate code 42b and the optimal code 44b are managed in association with the word 41b of the static word dictionary 41. That is, the word 41b, the intermediate code 42b, and the optimal code 44b are associated with each other by the word ID 41a being the identifier of the word 41b. As an example, when the word ID is "1", "さくら" as the word 41b, the "D2AC37" as the intermediate code 42b, and "010 . . . 011" as the optimal code 44b are associated with each other. The case in which the static word dictionary 41, the intermediate code table 42, and the optimal code table 44 are separately managed is explained; however, the embodiments are not limited thereto, and therefore these tables may be integrally managed. In this case, a word, an intermediate code, and an optimal code are simply set to one record for a word ID.

Figure 10:
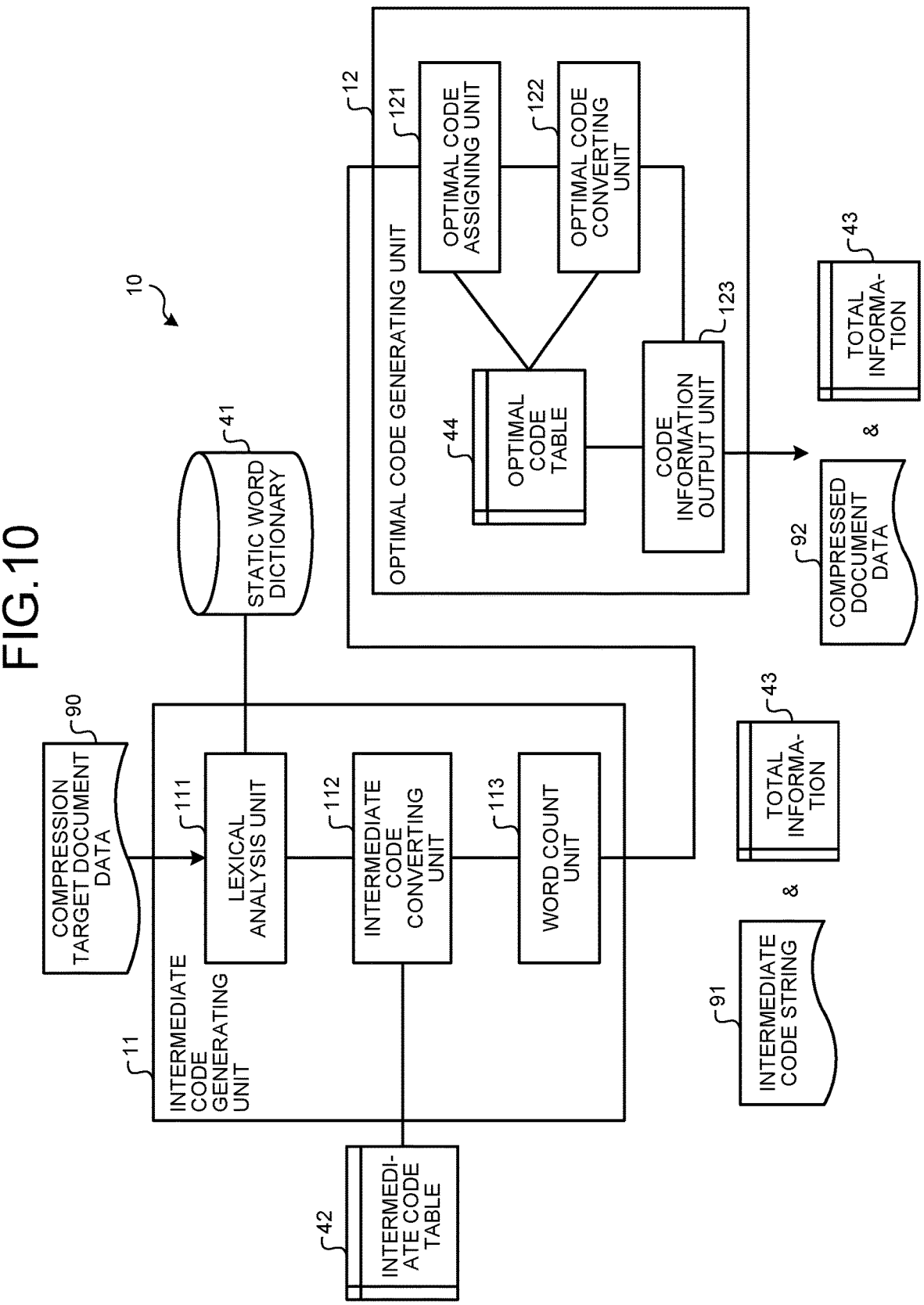
FIG. 10 is a functional block diagram of an example of the configuration of a compression unit according to the embodiment.

FIG. 10 is a functional block diagram of an example of the configuration of the compression unit according to the embodiment. The compression unit 10 includes an intermediate code generating unit 11 and an optimal code generating unit 12. The intermediate code generating unit 11 generates an intermediate code string 91 of a document in an uncompressed state. The optimal code generating unit 12 generates a compressed state of the document in an intermediate code state. The intermediate code generating unit 11 includes a lexical analysis unit 111, an intermediate code converting unit 112, and a word count unit 113. The optimal code generating unit 12 includes an optimal code assigning unit 121, an optimal code converting unit 122, and a code information output unit 123.

The lexical analysis unit 111 lexically analyzes compression target document data 90. The compression target document data 90 is data of a document in an uncompressed state. For example, the lexical analysis unit 111 inputs therein the compression target document data 90. The lexical analysis unit 111 refers to the static word dictionary 41 to lexically analyze the input compression target document data 90. As an example, when the compression target document data 90 is "さくら 学校 の . . . ", the lexical analysis unit 111 divides the data into "さくら", "学校", and "の" as a result of the lexical analysis. The lexical analysis unit 111 adds the words analyzed through the lexical analysis to the word 43b column of the total information 43. When the word to be added is already set to the total information 43, the lexical analysis unit 111 does not redundantly add the relevant word thereto.

The intermediate code converting unit 112 converts the lexically analyzed compression target document data 90 into intermediate codes. For example, the intermediate code converting unit 112 refers to the intermediate code table 42 to convert each word into an intermediate code for each of the words to which the compression target document data 90 is divided through the lexical analysis. As an example, it is assumed that the words to which the compression target document data 90 is divided through the lexical analysis are "さくら", "学校", and "の" and that the content of the intermediate code table 42 is as illustrated in FIG. 6. The intermediate code converting unit 112 refers to the intermediate code table 42 to associate the word "さくら" with the intermediate code "D2AC37". The intermediate code converting unit 112 associates the word with "学校" the intermediate code "D18FC5". The intermediate code converting unit 112 associates the word "の" with an intermediate code "E38289". The intermediate code converting unit 112 then generates the intermediate code string 91 corresponding to the compression target document data 90.

The word count unit 113 counts the number of appearances of an intermediate code for each document, and generates the total information 43. For example, the word count unit 113 increments a currently set value by one at a position in the number of appearances 43c specified with the word converted into the intermediate code by the intermediate code converting unit 112 and with the document number of the document. As an example, it is assumed that the intermediate code converting unit 112 converts "さくら" in the document of the document number "1" into the intermediate code "D2AC37". Then, the word count unit 113 sets, if "1" is currently set", "2" to the position in the number of appearances 43c specified with the word "さくら" and the document number "1".

The optimal code assigning unit 121 uses the total information 43 generated for each document to assign an optimal code to each word set to the static word dictionary 41. For example, the optimal code assigning unit 121 generates integrated total information obtained by merging pieces of total information 43 generated for each document. The number of appearances totaled for each word is set to the integrated total information. The optimal code assigning unit 121 assigns an optimal code to each word set to the static word dictionary 41 based on the integrated total information. The optimal code assigning unit 121 then generates the optimal code table 44.

The optimal code converting unit 122 optimally encodes the intermediate code string 91 of the compression target document data 90 based on the optimal code table 44. For example, the optimal code converting unit 122 sequentially acquires intermediate codes from the head of the intermediate code string 91. The optimal code converting unit 122 converts the sequentially acquired intermediate codes into optimal codes by referring to the optimal code table 44.

The code information output unit 123 outputs the optimal encoding result of the compression target document data 90 and the optimal code table 44 as compressed document data 92. The code information output unit 123 outputs the total information 43 generated by the optimal code assigning unit 121.

Figure 11:
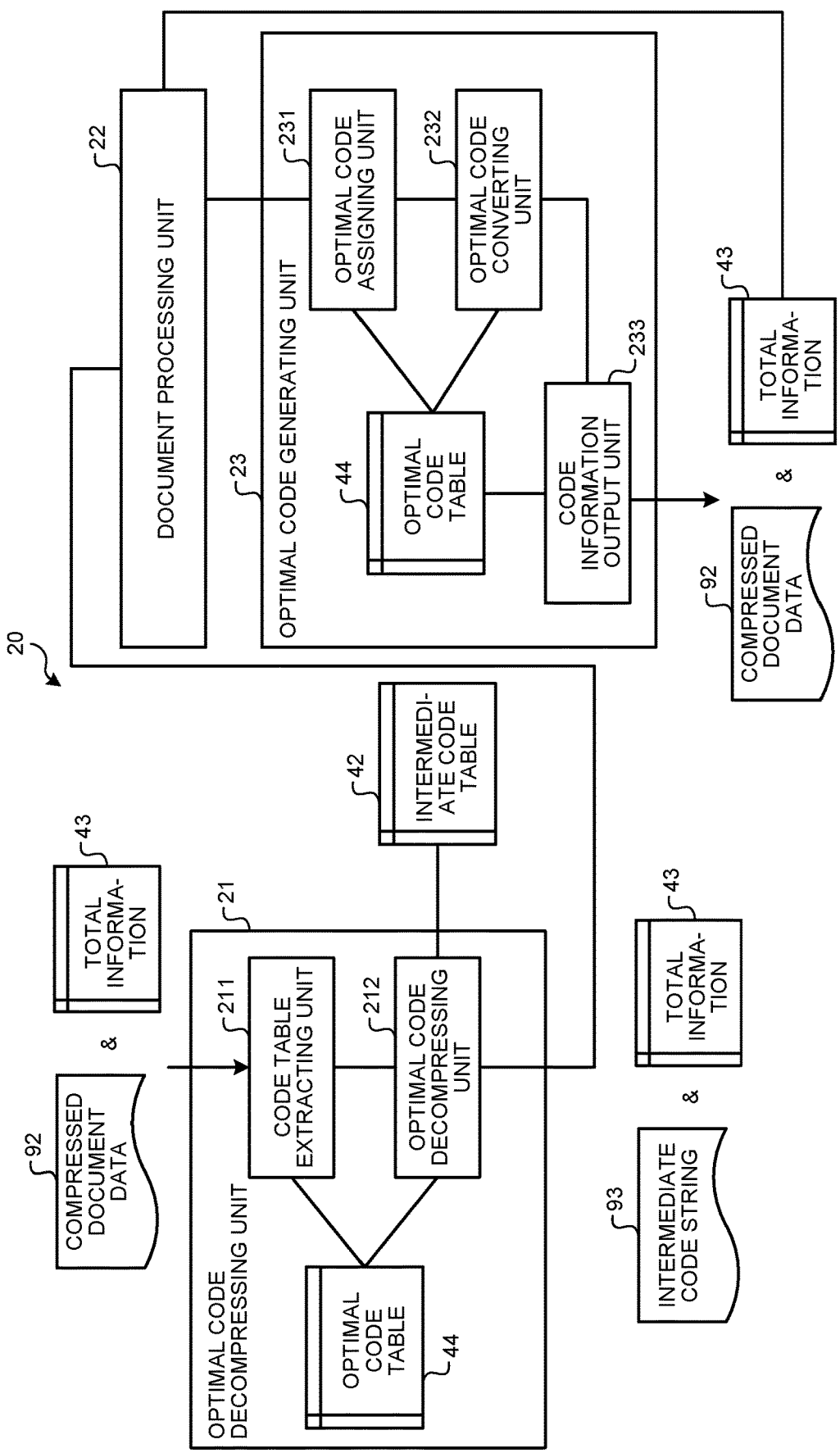
FIG. 11 is a functional block diagram of an example of the configuration of a document processing control unit according to the embodiment.

FIG. 11 is a functional block diagram of an example of the configuration of the document processing control unit according to the embodiment. The document processing control unit 20 includes an optimal code decompressing unit 21, a document processing unit 22, and an optimal code generating unit 23. The optimal code decompressing unit 21 decompresses the optimal code to obtain the intermediate code and generates an intermediate code string 93. The document processing unit 22 uses the intermediate code string 93 to perform processing, such as a search, on the document. The optimal code generating unit 23 generates a compressed state of the document in the intermediate code state as a result of performing the processing on the document. The optimal code decompressing unit 21 includes a code table extracting unit 211 and an optimal code decompressing unit 212. The optimal code generating unit 23 includes an optimal code assigning unit 231, an optimal code converting unit 232, and a code information output unit 233.

The code table extracting unit 211 extracts the optimal code table 44 included in the compressed document data 92. For example, the code table extracting unit 211 inputs therein the compressed document data 92 and the total information 43. The compressed document data 92 and the total information 43 are information output by the compression unit 10. The code table extracting unit 211 extracts the optimal code table 44 included in the compressed document data 92 into, for example, the storage unit 40.

The optimal code decompressing unit 212 refers to the optimal code table 44 and the intermediate code table 42 to convert each optimal code included in the compressed document data 92 into the intermediate code. For example, the optimal code decompressing unit 212 acquires only a predetermined number of bits from the head of the optimal encoding result included in the compressed document data 92. The optimal code decompressing unit 212 refers to the optimal code table 44 to search for the optimal code 44b included in the data of the acquired number of bits and specifies the word ID 44a. The optimal code decompressing unit 212 refers to the intermediate code table 42 to determine the intermediate code 42b corresponding to the specified word ID 44a. The optimal code decompressing unit 212 then acquires only the predetermined number of bits from next bit of a matched optimal code in optimal encoding results in order to search for a next optimal code, performs search processing, and converts the optimal code into the intermediate code. The optimal code decompressing unit 212 generates the intermediate code string 93 corresponding to the compressed document data 92. The predetermined number of bits only has to be, for example, the number of bits larger than the maximum number of bits of the optimal codes.

The document processing unit 22 uses the intermediate code string 93 and the total information 43 to perform processing on the document. For example, when the processing performed on the document is search processing, the document processing unit 22 inputs a search keyword. The search keyword is a not encoded keyword. When the search keyword is present in the static word dictionary 41, the document processing unit 22 refers to the total information 43 to determine the document including the search keyword. That is, the document processing unit 22 determines the document of the document number 43a, in which the number of appearances 43c for the search keyword is 1 or more, as the search result. As one example, it is assumed that the search keyword is "学校" and that the total information 43 is the content illustrated in FIG. 7. The document processing unit 22 determines the documents of the document numbers 43a "1" and "2" in which the number of appearances 43c for "学校" as the search keyword is 1 or more, as the search result.

When there is no search keyword in the static word dictionary 41, the document processing unit 22 decomposes the search keyword into a word and a character. There is a case in which the search keyword is a linking word as an example. The document processing unit 22 refers to the total information 43 to specify the document including the decomposed word and character. The document processing unit 22 converts the search keyword into the intermediate code and determines the document including the converted intermediate code of the search keyword from the intermediate code state of the specified document.

The document processing unit 22 integrates the determined documents while remaining in the intermediate code state and extracts the integrated document as a search result. The document processing unit 22 outputs the extracted search result and the total information.

As the processing for the document in the document processing unit 22, the search processing is exemplified as an example; however, the embodiments are not limited thereto. The document processing unit 22 may perform replacement processing as the processing for the document. A procedure of the replacement processing will be explained later.

The optimal code assigning unit 231 uses the total information 43 generated for each document to assign an optimal code to each of the words set to the static word dictionary 41. Because the processing of the optimal code assigning unit 231 is the same as that of the optimal code assigning unit 121 in the compression unit 10, explanation thereof is omitted.

The optimal code converting unit 232 optimally encodes, based on the optimal code table 44, the intermediate code string in the document data indicating the result processed by the document processing unit 22. Because the processing of the optimal code converting unit 232 is the same as that of the optimal code converting unit 122 in the compression unit 10, explanation thereof is omitted.

The code information output unit 233 outputs the optimal encoding result of the document data indicating the result processed by the document processing unit 22 and the optimal code table 44, as the compressed document data 92. The code information output unit 233 outputs the total information 43. The processing of the code information output unit 233 is the same as that of the code information output unit 123 in the compression unit 10.

Figure 12:
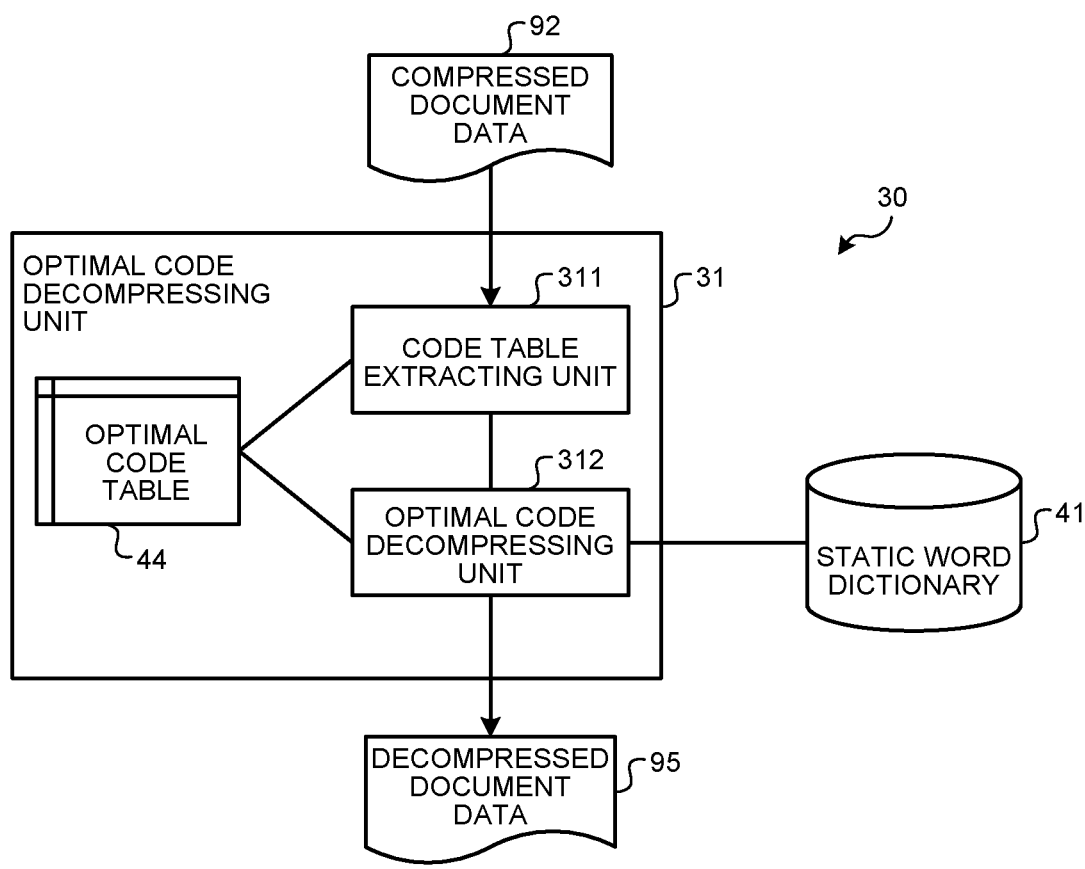
FIG. 12 is a functional block diagram of an example of the configuration of a decompression unit according to the embodiment.

FIG. 12 is a functional block diagram of an example of the configuration of the decompression unit according to the embodiment. The decompression unit 30 includes an optimal code decompressing unit 31. The optimal code decompressing unit 31 decompresses the optimal code to generate decompressed document data 95. The optimal code decompressing unit 31 includes a code table extracting unit 311 and an optimal code decompressing unit 312.

The code table extracting unit 311 extracts the optimal code table 44 included in the compressed document data 92. For example, the code table extracting unit 311 inputs therein the compressed document data 92. The compressed document data 92 is information output by the compression unit 10 or by the document processing control unit 20. The code table extracting unit 311 extracts the optimal code table 44 included in the compressed document data 92.

The optimal code decompressing unit 312 refers to the optimal code table 44 and the static word dictionary 41 to convert each optimal code included in the compressed document data 92 into a word. For example, the optimal code decompressing unit 312 acquires only a predetermined number of bits from the head of the optimal encoding result included in the compressed document data 92. The optimal code decompressing unit 312 refers to the optimal code table 44 to search for the optimal code 44b included in the data of the acquired number of bits and specifies the word ID 44a. The optimal code decompressing unit 312 refers to the static word dictionary 41 to determine the word 41b corresponding to the specified word ID 44a. The optimal code decompressing unit 312 then acquires only the predetermined number of bits from next bit of a matched optimal code in optimal encoding results in order to search for a next optimal code, performs search processing, and converts the optimal code into the word. The optimal code decompressing unit 312 generates the decompressed document data 95 corresponding to the compressed document data 92. The predetermined number of bits only has to be, for example, the number of bits larger than the maximum number of bits of the optimal codes.

Figure 13A:
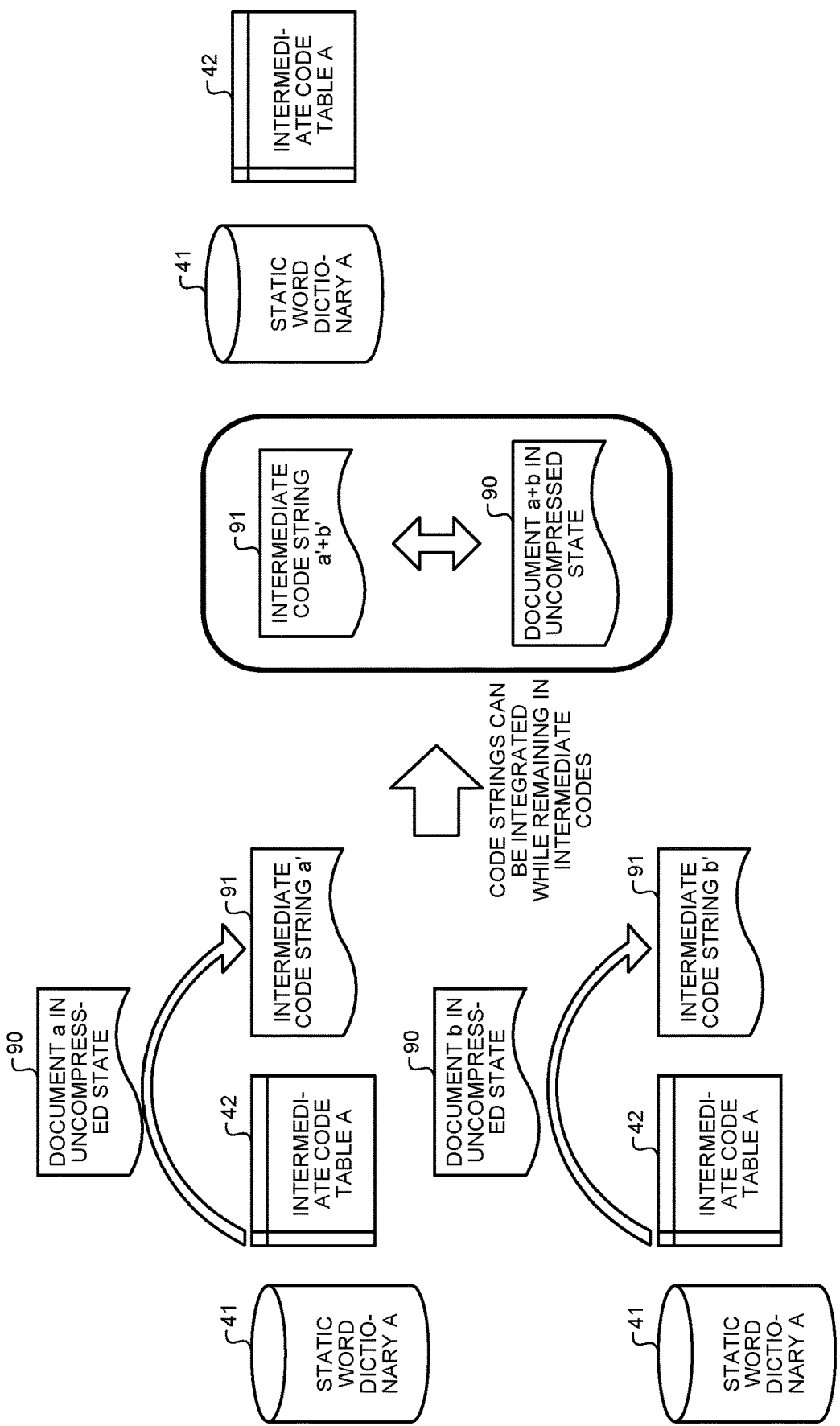
FIG. 13A is a diagram for explaining an example of document integration.
Figure 13B:
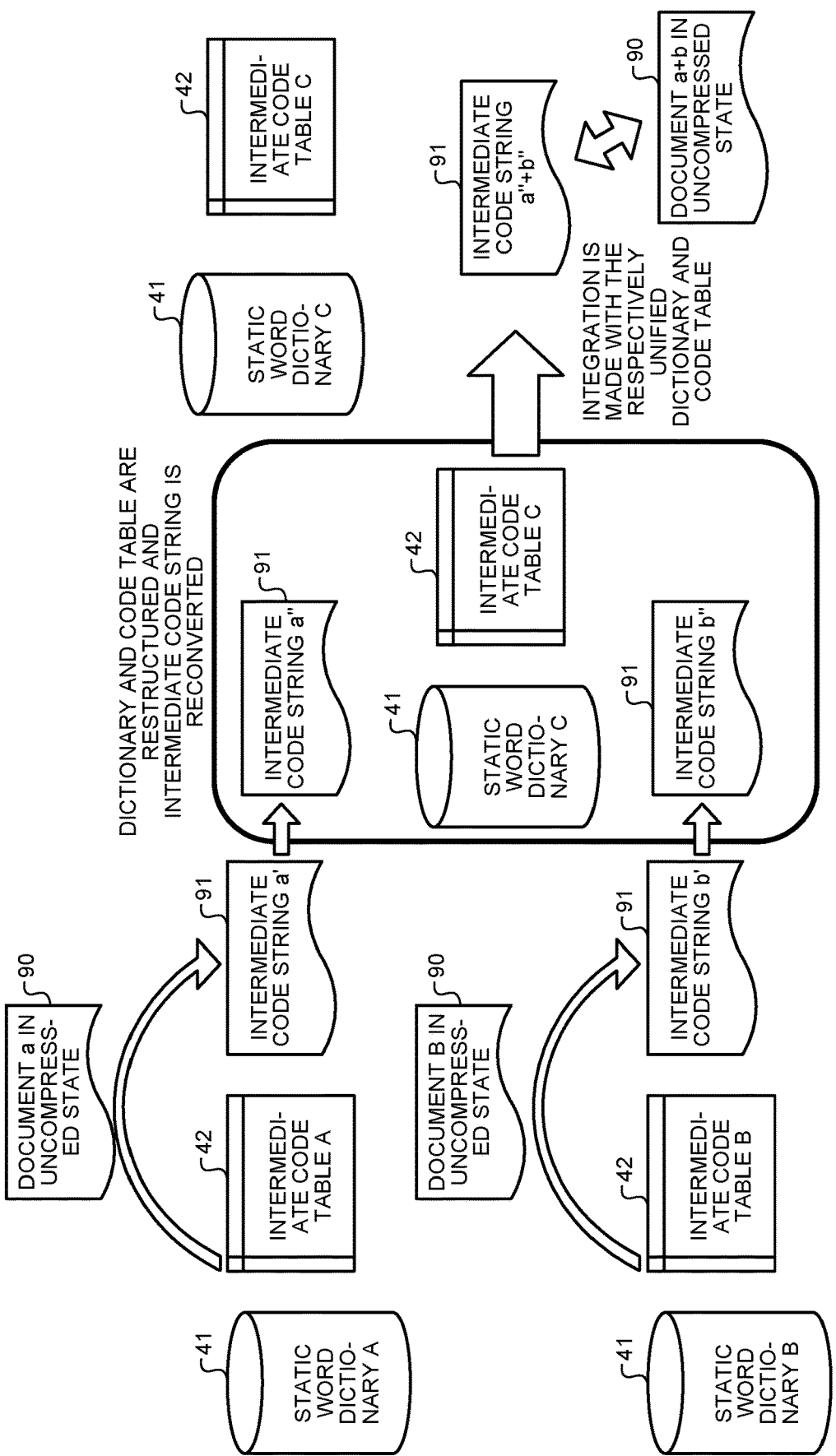
FIG. 13B is a diagram for explaining another example of the document integration.

One example of document integration will be explained below with reference to FIG. 13A and FIG. 13B. FIG. 13A and FIG. 13B are diagrams for explaining examples of document integration. An example of a case will be explained with reference to FIG. 13A and FIG. 13B, in which the intermediate code generating unit 11 of the compression unit 10 generates intermediate code strings of a plurality of documents in the uncompressed state (compression target document data 90) a and b and integrates the intermediate code strings.

A case in which the intermediate code generating unit 11 uses static word dictionaries 41 and intermediate code tables 42, each of which is same as each other, for each compression target will be explained with reference to FIG. 13A. In this case, the static word dictionaries 41 are represented as a static word dictionary A. The intermediate code tables 42 are represented as an intermediate code table A.

As illustrated in FIG. 13A, the lexical analysis unit 111 refers to the static word dictionary A to lexically analyze a document a in the uncompressed state. The intermediate code converting unit 112 refers to the intermediate code table A to convert each word into an intermediate code for each of the words divided through lexical analysis. As a result, the intermediate code generating unit 11 converts the document a in the uncompressed state into an intermediate code string a'.

The lexical analysis unit 111 then refers to the static word dictionary A to lexically analyze a document b in the uncompressed state. The intermediate code converting unit 112 refers to the intermediate code table A to convert each word into an intermediate code for each of the words divided through lexical analysis. As a result, the intermediate code generating unit 11 converts the document b in the uncompressed state into an intermediate code string b'.

Because the static word dictionaries A and the intermediate code tables A, each of which is the same as each other, are used at the time of compression, the intermediate code generating unit 11 can integrate the intermediate code strings while remaining in the intermediate state. In this case, the intermediate code generating unit 11 can integrate the intermediate code strings a' and b' of the respective documents a and b in the uncompressed state, which are used, into an intermediate code string a'+b'.

A case in which the intermediate code generating unit 11 uses static word dictionaries 41 and intermediate code tables 42, each of which is different from each other, for each compression target will be explained with reference to FIG. 13B. In this case, the static word dictionaries 41 are represented as static word dictionaries A and B. The intermediate code tables 42 are represented as intermediate code tables A and B.

As illustrated in FIG. 13B, the lexical analysis unit 111 refers to the static word dictionary A to lexically analyze the document a in the uncompressed state. The intermediate code converting unit 112 refers to the intermediate code table A to convert each word into an intermediate code for each of the words divided through lexical analysis. As a result, the intermediate code generating unit 11 converts the document a in the uncompressed state into the intermediate code string a'.

The lexical analysis unit 111 then refers to the static word dictionary B to lexically analyze the document b in the uncompressed state. The intermediate code converting unit 112 refers to the intermediate code table B to convert each word into an intermediate code for each of the words divided through lexical analysis. As a result, the intermediate code generating unit 11 converts the document b in the uncompressed state into the intermediate code string b'.

Because the static word dictionaries 41 and the intermediate code tables 42, each of which is different from each other for each document, are used at the time of compression, the intermediate code generating unit 11 restructures the static word dictionaries 41 and the intermediate code tables 42 respectively in order to unify each of them. That is, the intermediate code generating unit 11 restructures the static word dictionaries 41 into dictionaries including the contents of the static word dictionaries A and B, and also restructures the intermediate code tables 42 into tables including the contents of the intermediate code tables A and B. The intermediate code generating unit 11 uses the restructured static word dictionary 41 and the restructured intermediate code table 42 to reconvert the intermediate code string a' into an intermediate code string a". The intermediate code generating unit 11 uses the restructured static word dictionary 41 and intermediate code table 42 to reconvert the intermediate code string b' into an intermediate code string b".

Because the respectively unified static word dictionary 41 and intermediate code table 42 are used, the intermediate code generating unit 11 can integrate the intermediate code strings while remaining in the intermediate state. In this case, the intermediate code generating unit 11 can integrate the intermediate code strings a" and b" of the respective documents a and b in the uncompressed state, which are used, into an intermediate code string a"+b".

The case has been explained with reference to FIG. 13A and FIG. 13B, in which the compression unit 10 respectively generates the intermediate code strings of the documents in the uncompressed state (the compression target document data 90) a and b at the time of compression and integrates the intermediate code strings while remaining in the intermediate code state. However, even the document processing control unit 20 can integrate the intermediate code strings while remaining in the intermediate state. In other words, the document processing control unit 20 uses the respectively unified integrated optimal code table 44 and intermediate code table 42 to respectively generate intermediate code strings of the documents in the compressed state. The document processing control unit 20 uses the total information 43 generated at the time of compression, which makes it possible to integrate, for example, documents having search keywords while remaining in the intermediate code state.

Figure 14:
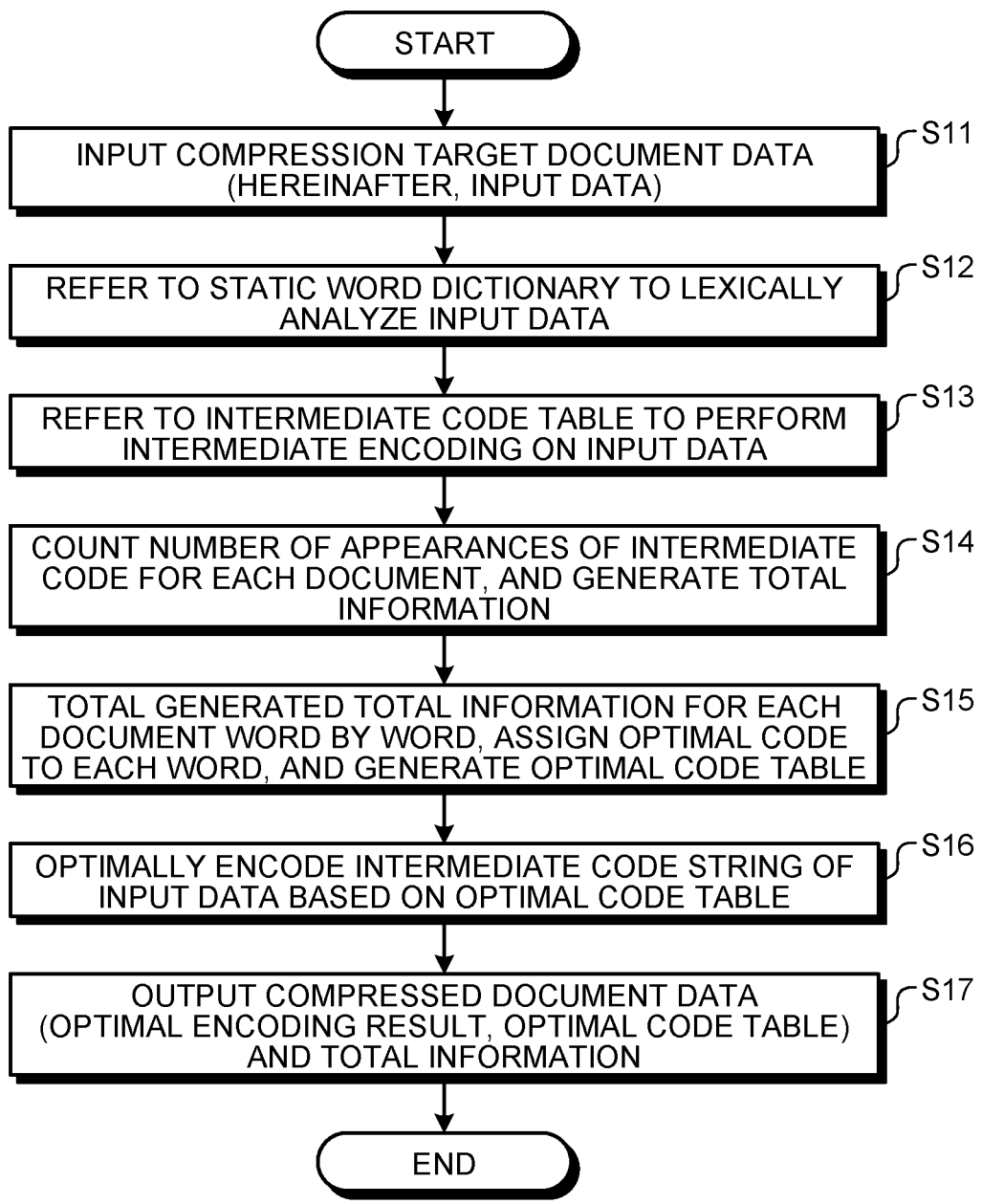
FIG. 14 is a flowchart of a procedure of the compression unit according to the embodiment.

FIG. 14 is a flowchart of a procedure of the compression unit according to the embodiment. The compression target document data 90 is assumed to include a plurality of documents.

As illustrated in FIG. 14, the compression unit 10 inputs therein the compression target document data 90 (hereinafter, "input data") (Step S11). The compression unit 10 refers to the static word dictionary 41 to lexically analyze the input data (Step S12), and adds the word analyzed through the lexical analysis to word 43*b* column of the total information 43.

The compression unit 10 refers to the intermediate code table 42 to perform intermediate encoding on the input data (Step S13). For example, the compression unit 10 refers to the intermediate code table 42 to associate each of the words divided through the lexical analysis with an intermediate code. The compression unit 10 then generates the intermediate code string 91 corresponding to the input data.

The compression unit 10 counts the number of appearances of the intermediate code in each document and generates the total information 43 (Step S14). For example, the compression unit 10 increments a currently set value by one at the position of the number of appearances 43*c*, in the total information 43, specified with the word 43*b* converted to the intermediate code and with the document number 43*a* of the document.

The compression unit 10 totals the total information 43 for each document word by word, assigns an optimal code to each word, and generates the optimal code table 44 (Step S15). For example, the compression unit 10 generates integrated total information in which pieces of the total information 43 generated for each document are merged. The number of appearances totaled for each word is set to the integrated total information. The compression unit 10 assigns an optimal code to each of the words set to the static word dictionary 41 based on the integrated total information, and generates the optimal code table 44.

The compression unit 10 optimally encodes the intermediate code string 91 corresponding to the input data based on the optimal code table 44 (Step S16). For example, the compression unit 10 sequentially acquires intermediate codes from the head of the intermediate code string 91. The compression unit 10 reads the word ID 42*a* corresponding to the intermediate code 42*b* of the intermediate code table 42 for the acquired intermediate code. The compression unit 10 refers to the optimal code table 44 to convert the acquired intermediate code into the optimal code 44*b* associated with the word ID 42*a*.

The compression unit 10 outputs an optimal encoding result in which the input data is optimally encoded and the optimal code table 44 as the compressed document data and also outputs the total information 43 (Step S17). Then, the compression unit 10 ends the compression processing.

Figure 15:
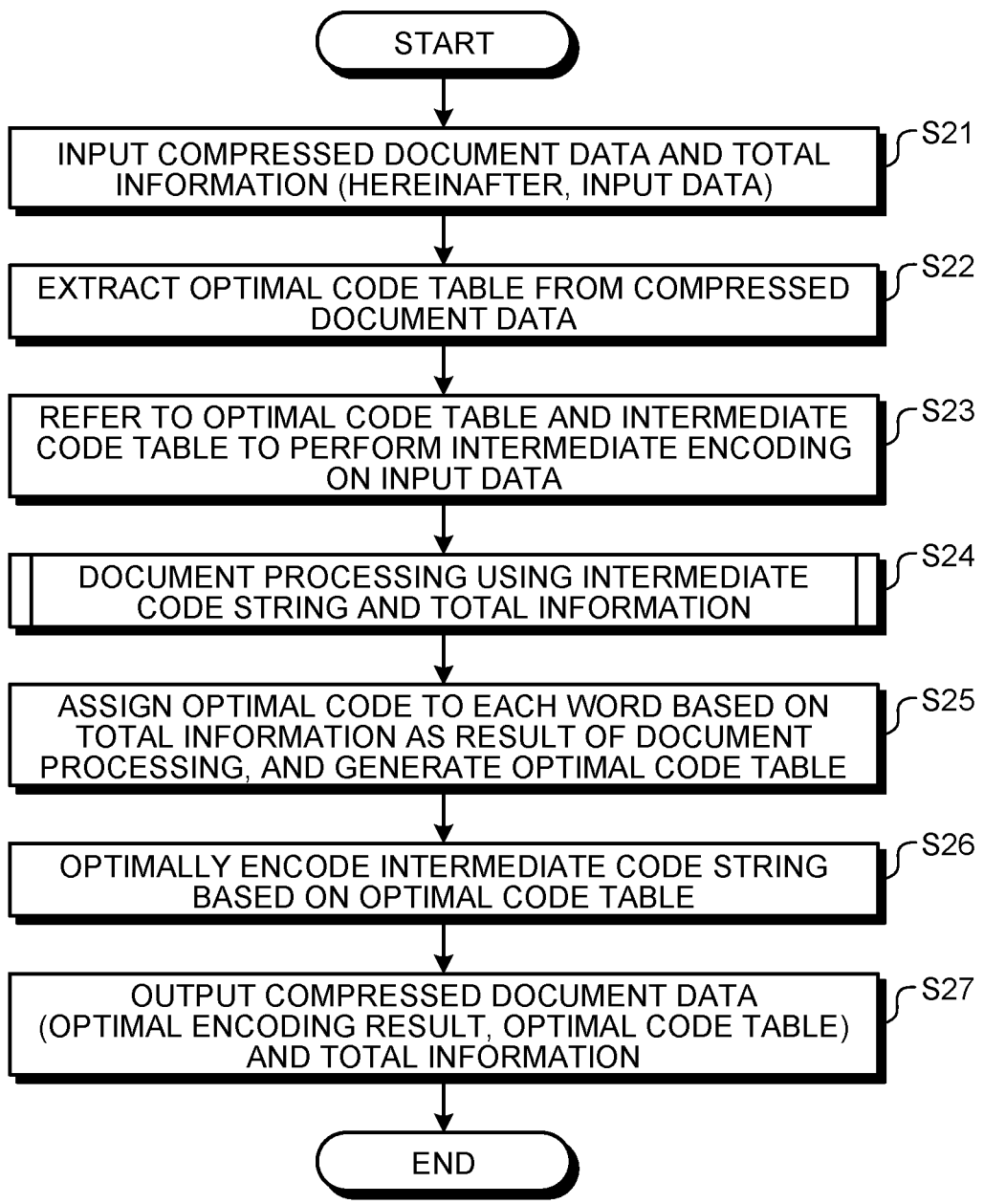
FIG. 15 is a flowchart of a procedure of the document processing control unit according to the embodiment.

FIG. 15 is a flowchart of a procedure of the document processing control unit according to the embodiment.

As illustrated in FIG. 15, the document processing control unit 20 inputs therein the compressed document data 92 and the total information 43 (hereinafter, "input data") (Step S21). The document processing control unit 20 extracts the optimal code table 44 from the compressed document data 92 (Step S22).

The document processing control unit 20 refers to the optimal code table 44 and the intermediate code table 42 to perform an intermediate encoding on the input data (Step S23). For example, the document processing control unit 20 acquires only a predetermined number of bits from the head of the optimal encoding result included in the input data. The document processing control unit 20 refers to the optimal code table 44 to search for the optimal code 44*b* included in the data of the acquired number of bits and specifies the word ID 44*a*. The document processing control unit 20 refers to the intermediate code table 42 to determine the intermediate code 42*b* corresponding to the specified word ID 44*a*. The document processing control unit 20 then generates the intermediate code string 93 corresponding to the optimal encoding result.

The document processing control unit 20 performs document processing using the intermediate code string 93 and the total information 43 (Step S24). A procedure of the document processing using the intermediate code string 93 and the total information 43 will be explained later.

The document processing control unit 20 performs assignment of optimal codes based on the total information 43 as a result of the document processing, and generates the optimal code table 44 (Step S25). For example, the document processing control unit 20 assigns an optimal code to each of the words set to the static word dictionary 41 based on the total information 43 as a result of the document processing, and generates the optimal code table 44.

The document processing control unit 20 optimally encodes the intermediate code string 93 based on the optimal code table 44 (Step S26). For example, the document processing control unit 20 sequentially acquires intermediate codes from the head of the intermediate code string 93. The document processing control unit 20 reads the word ID 42a, for the acquired intermediate code, corresponding to the intermediate code 42b of the intermediate code table 42. The document processing control unit 20 refers to the optimal code table 44 to convert the acquired intermediate code into the optimal code 44b associated with the word ID 42a.

The document processing control unit 20 outputs the optimal encoding result in which the intermediate code string 93 is optimally encoded and the optimal code table 44 as the compressed document data, and also outputs the total information 43 (Step S27). Then, the compression unit 10 ends the document processing control.

Figure 16:
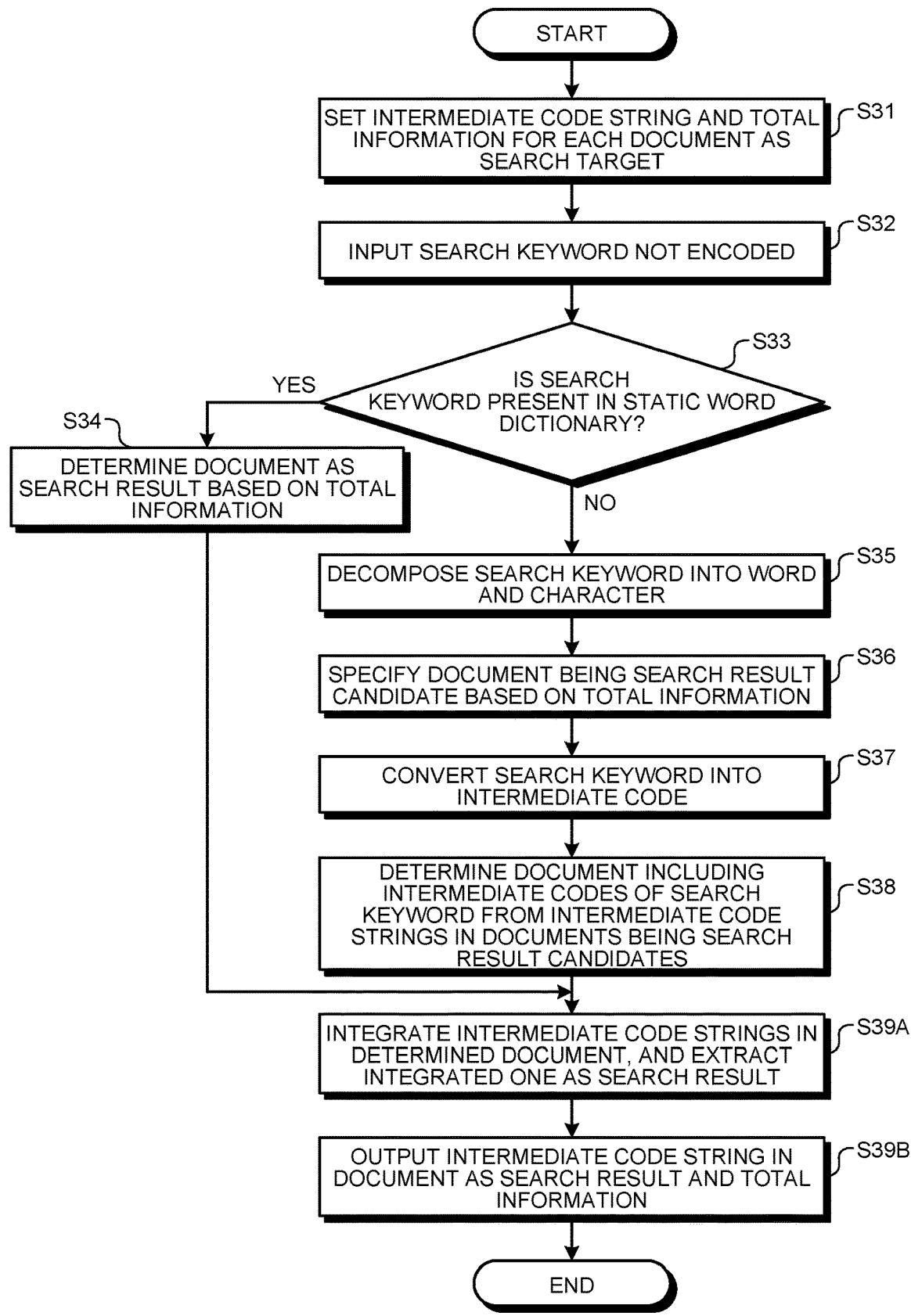
FIG. 16 is a flowchart of a search procedure of the document processing control unit according to the embodiment.

FIG. 16 is a flowchart of a search procedure of the document processing control unit according to the embodiment.

As illustrated in FIG. 16, the document processing control unit 20 sets the intermediate code string 93 and the total information 43 of each document as search targets (Step S31). The document processing control unit 20 inputs therein a not encoded search keyword (Step S32). The document processing control unit 20 determines whether the search keyword is present in the static word dictionary 41 (Step S33).

When the search keyword is present in the static word dictionary 41 (Yes at Step S33), the document processing control unit 20 determines the document as a search result based on the total information 43 (Step S34). For example, the document processing control unit 20 refers to the total information 43 to determine the document including the search keyword. That is, the document processing control unit 20 determines the document of the document number 43a, in which the number of appearances 43c for the search keyword is 1 or more, as the search result. Then, the document processing control unit 20 proceeds to Step S39A.

Meanwhile, when the search keyword is not present in the static word dictionary 41 (No at Step S33), the document processing control unit 20 decomposes the search keyword into word(s) and character(s) (Step S35). The document processing control unit 20 specifies the document being a search result candidate based on the total information 43 (Step S36). For example, the document processing control unit 20 specifies the document of the document number 43a in which the number of appearances 43c for decomposed word(s) and character(s) is 1 or more.

The document processing control unit 20 converts the search keyword into an intermediate code (Step S37). For example, the document processing control unit 20 refers to the static word dictionary 41 and the intermediate code table 42 to convert the word and the character obtained by decomposing the search keyword into intermediate codes.

The document processing control unit 20 determines the document including the intermediate codes of the search keyword from the intermediate code strings in the documents being search result candidates (Step S38). Then, the document processing control unit 20 proceeds to Step S39A.

At Step S39A, the document processing control unit 20 integrates the intermediate code strings in the determined document, and extracts the integrated one as a search result (Step S39A). The document processing control unit 20 outputs the search result and total information (Step S39B). Then, the document processing control unit 20 ends the search processing.

Figure 17:
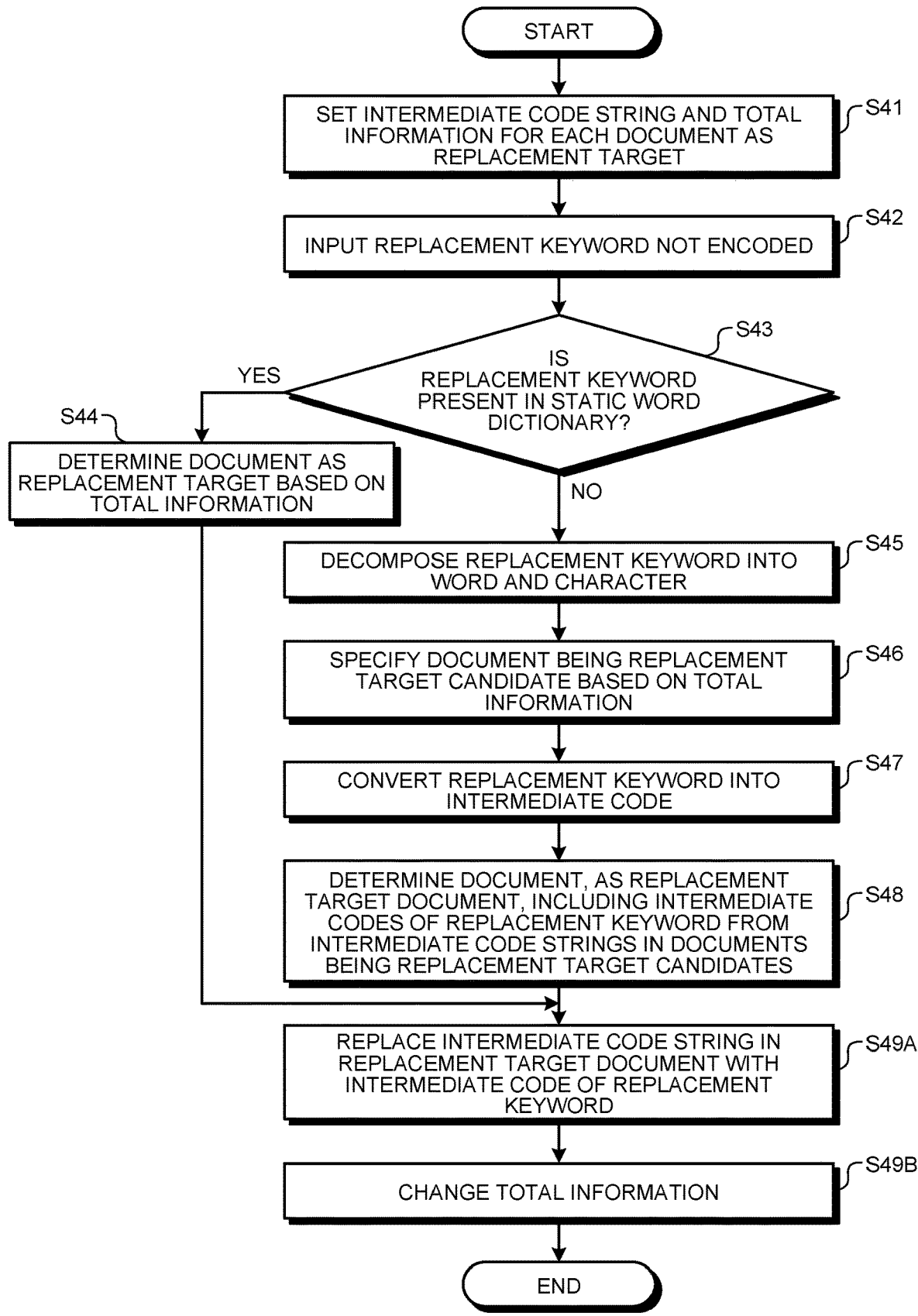
FIG. 17 is a flowchart of a replacement procedure of the document processing control unit according to the embodiment.

FIG. 17 is a flowchart of a replacement procedure of the document processing control unit according to the embodiment.

As illustrated in FIG. 17, the document processing control unit 20 sets the intermediate code string 93 and the total information 43 for each document as a replacement target (Step S41). The document processing control unit 20 inputs therein a not encoded replacement keyword (Step S42). The replacement keyword includes a keyword before the replacement and a keyword after the replacement. The document processing control unit 20 determines whether the keyword before the replacement is present in the static word dictionary 41 (Step S43).

When the keyword before the replacement is present in the static word dictionary 41 (Yes at Step S43), the document processing control unit 20 determines the document as a replacement target based on the total information 43 (Step S44). For example, the document processing control unit 20 refers to the total information 43 to determine the document including the keyword before the replacement. That is, the document processing control unit 20 determines the document of the document number 43a, in which the number of appearances 43c for the keyword before the replacement is 1 or more, as the replacement target. Then, the document processing control unit 20 proceeds to Step S49A.

Meanwhile, when the keyword before the replacement is not present in the static word dictionary 41 (No at Step S43), the document processing control unit 20 decomposes the keyword before the replacement into word(s) and character(s) (Step S45). The document processing control unit 20 specifies the document being a replacement target candidate based on the total information 43 (Step S46). For example, the document processing control unit 20 specifies the document of the document number 43a in which the number of appearances 43c for decomposed word(s) and character(s) is 1 or more.

The document processing control unit 20 converts the replacement keyword into an intermediate code (Step S47). For example, the document processing control unit 20 refers to the static word dictionary 41 and the intermediate code table 42, and converts the word and the character obtained by decomposing the replacement keyword into intermediate codes.

The document processing control unit 20 determines the document including intermediate codes of the keyword before the replacement, as a replacement target document, from the intermediate code strings in the documents being replacement target candidates (Step S48). Then, the document processing control unit 20 proceeds to Step S49A.

At Step S49A, the document processing control unit 20 replaces an intermediate code string in the replacement target document with intermediate codes of the replacement keyword (Step S49A). That is, the document processing control unit 20 replaces the intermediate code of the keyword before the replacement with the intermediate code of the keyword after the replacement for the intermediate code string in the replacement target document.

The document processing control unit 20 changes the total information 43 (Step S49B). For example, the document processing control unit 20 decrements by one the number of appearances 43c specified with the replacement target document and with the keyword before the replacement. The document processing control unit 20 increments by one the number of appearances 43c specified with the replacement target document and with the keyword after the replacement. Then, the document processing control unit 20 ends the replacement processing.

Figure 18:
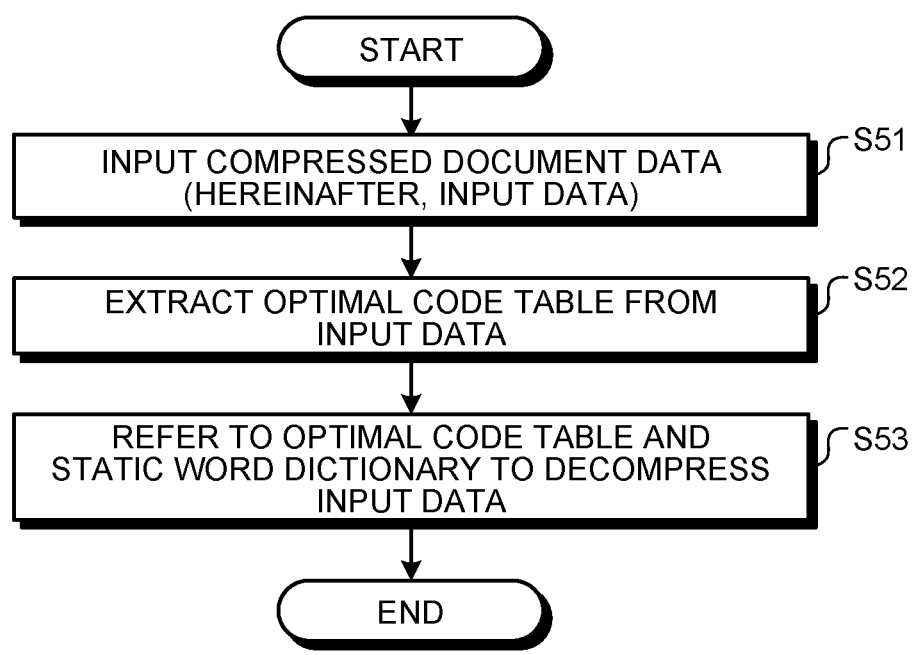
FIG. 18 is a flowchart of a procedure of the decompression unit according to the embodiment.

FIG. 18 is a flowchart of a procedure of the decompression unit according to the embodiment.

As illustrated in FIG. 18, the decompression unit 30 inputs therein the compressed document data 92 (hereinafter, "input data") (Step S51). The document processing control unit 20 extracts the optimal code table 44 from the input data (Step S52).

The decompression unit 30 refers to the optimal code table 44 and the static word dictionary 41 to decompress the input data (Step S53). For example, the decompression unit 30 acquires only a predetermined number of bits from the head of the optimal encoding result included in the input data. The decompression unit 30 refers to the optimal code table 44 to search for the optimal code 44b included in the data of the acquired number of bits and specifies the word ID 44a. The decompression unit 30 refers to the static word dictionary 41 to determine the word 41b corresponding to the specified word ID 44a. The decompression unit 30 then generates a decompression result corresponding to the optimal encoding result. Then, the decompression unit 30 ends the decompression processing.

Figure 19A:
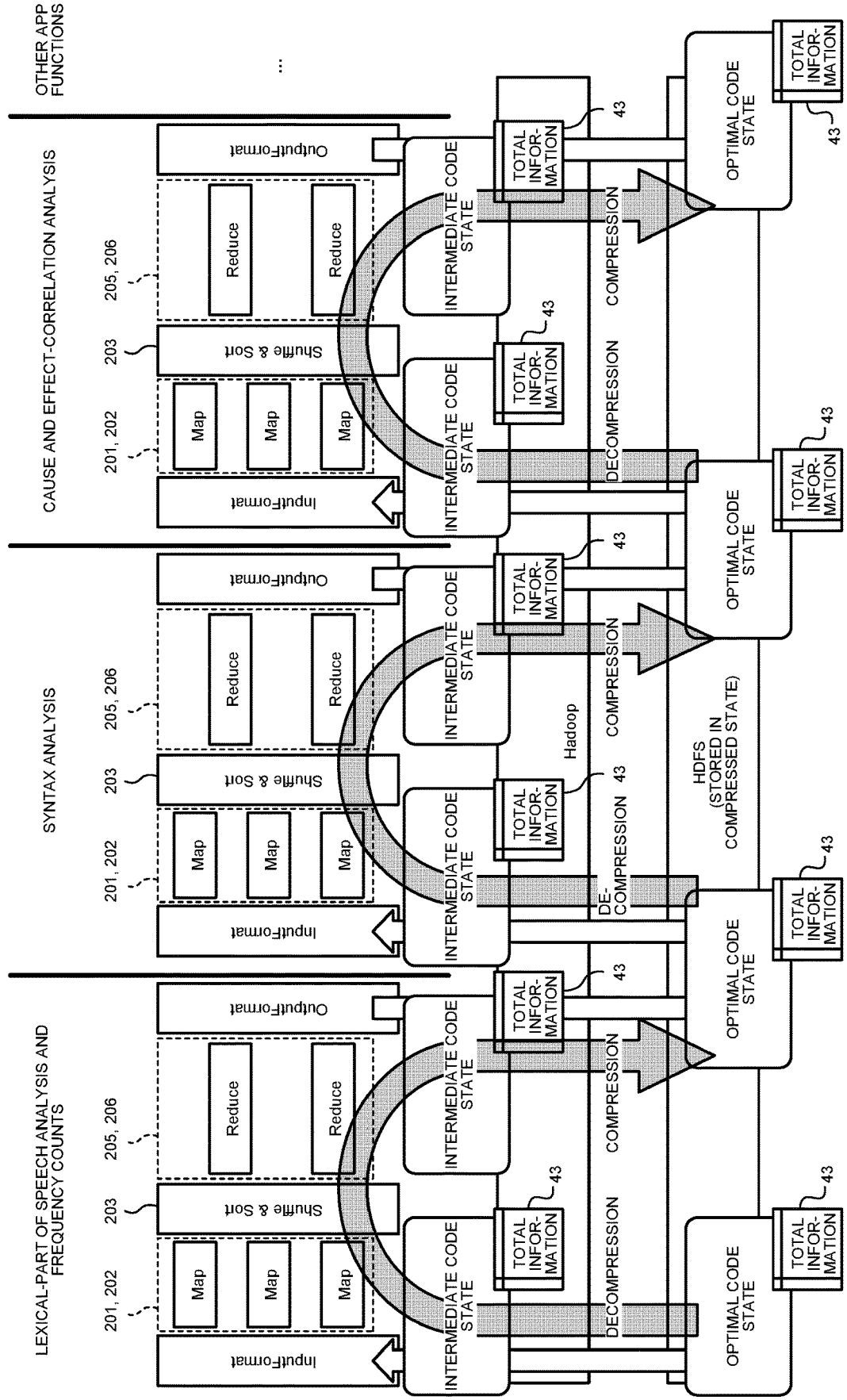
FIG. 19A is a diagram of an example of an application in the document processing according to the embodiment.
Figure 19B:
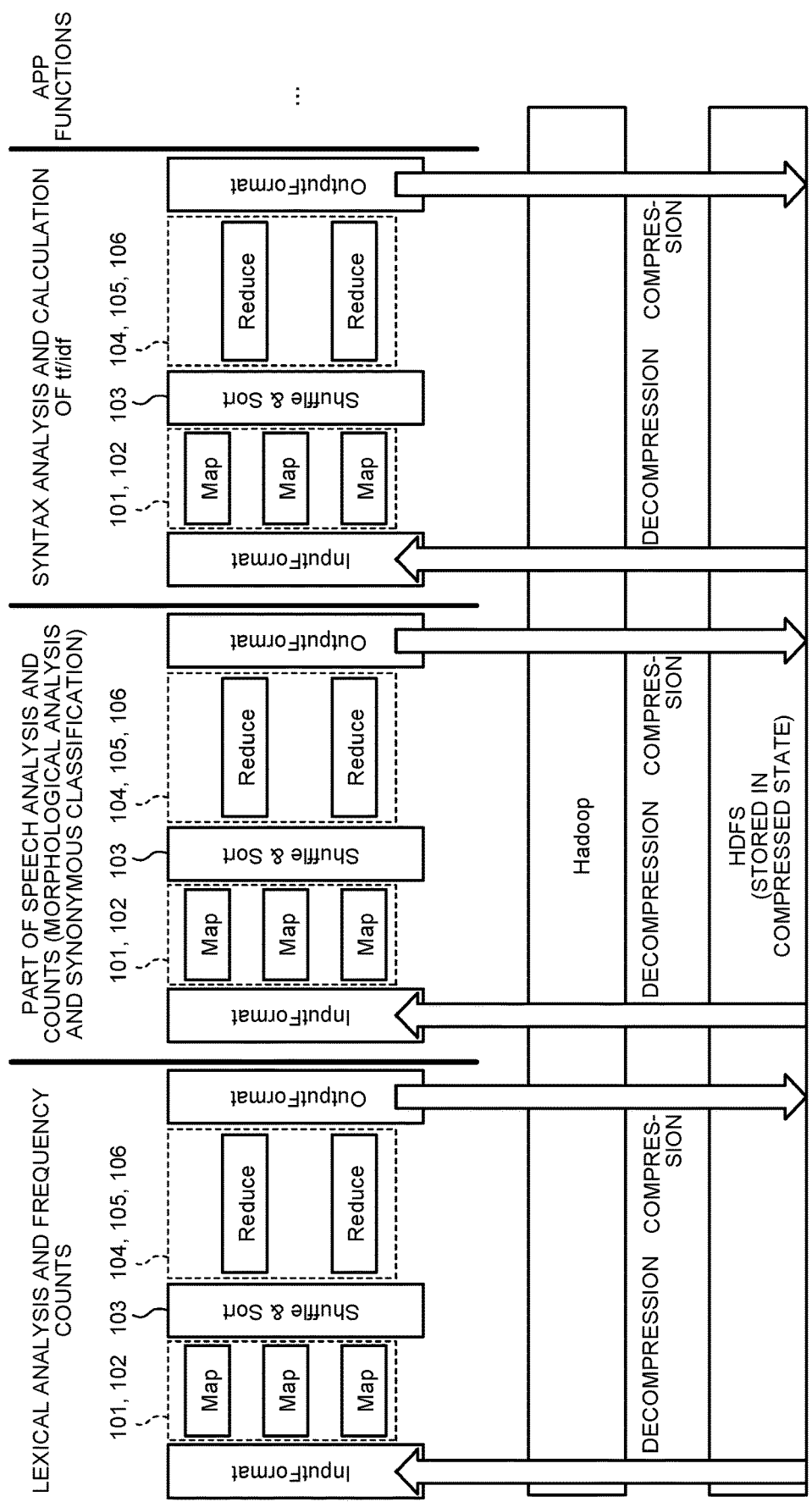
FIG. 19B is a diagram of a reference example of the application in the document processing.

FIG. 19A and FIG. 19B are diagrams of examples of applications in the document processing. FIG. 19A is a diagram of an example of the application in the document processing according to the embodiment. FIG. 19B is a diagram of a reference example of the application in the document processing. Both of FIG. 19A and FIG. 19B represent processing when a Hadoop Distributed File System (HDFS) is implemented in order to perform text mining. As illustrated in FIG. 19A, in the left view, it is used for lexical-part of speech analysis and frequency counts. In the middle view, it is used for syntax analysis. In the right view, it is used for cause and effect-correlation analysis.

"Map" in FIG. 19A is a function of reading and filing the input data, which corresponds to the decompression 201 and the search/division 202 illustrated in FIG. 2B. "Shuffle & Sort" corresponds to the integration 203 illustrated in FIG. 2B. "Reduce" is a function of outputting the result for integrated data, which corresponds to the total 205 and the use 206.

As illustrated in FIG. 19A, in the left view, for example, the HDFS manages optimal code states for the documents and the total information 43. In "Map", the optimal code decompressing unit 21 converts the optimal code state of the documents into the intermediate code state. The optimal code decompressing unit 21 generates the intermediate code string 93 corresponding to the optimal code state. The document processing unit 22 refers to the total information 43 to determine the intermediate code string 93 of the document including the search keyword from the intermediate code strings 93.

In "Shuffle & Sort", the document processing unit 22 integrates the intermediate code strings 93 of the determined document.

In "Reduce", the document processing unit 22 totals the intermediate code strings 93 of the determined document and changes the total information 43. The document processing unit 22 uses the total information 43 to perform lexical-part of speech analysis and frequency counts in the text mining.

The optimal code generating unit 23 uses the total information 43 to assign an optimal code to each word and generates the optimal code table 44. The optimal code generating unit 23 uses the generated optimal code table 44 to optically encode the intermediate code string 93. That is, the optimal code generating unit 23 converts the intermediate code state into the optimal code state, and causes the HDFS to manage the converted optimal code state and the total information 43.

Thus, the document processing according to the embodiment can use the total information 43 generated at the time of compression for the processing such as a search over the documents. By performing the processing such as a search and the processing such as an integration over the documents in the intermediate code state, the document processing according to the embodiment can reduce the load of I/O, as compared with the processing performed in the uncompressed state of the decompressed document, so that the processing can be speeded up.

FIG. 19B represents a reference example of the document processing performed in the uncompressed state of the decompressed document. "Map" in FIG. 19B is a function of reading and filing the input data, which corresponds to the decompression 101 and the lexical analysis 102 illustrated in FIG. 1B. "Shuffle & Sort" corresponds to the integration 103 illustrated in FIG. 1B. "Reduce" is a function of outputting the result for integrated data, which corresponds to the search/division/replacement 104, the total 105, and the use 106.

As illustrated in FIG. 19B, in the left view, for example, the HDFS manages optimal code states for the documents. In "Map", the document processing decompresses the documents in the optimal code state. The document processing then performs lexical analysis on the decompressed documents.

In "Shuffle & Sort", the document processing integrates the lexically analyzed documents.

In "Reduce", the document processing performs the processing such as a search over the decompressed documents. The document processing totals the documents after the processing such as a search, and generates total information. The document processing uses the total information to perform lexical-part of speech analysis and frequency counts in the text mining.

The document processing uses the total information to assign an optimal code to a word, and generates an optimal code table. The document processing uses the generated optimal code table to optimally encode a plurality of documents. That is, the document processing converts the decompressed documents into optimal code states, and causes the HDFS to manage the converted optimal code states.

In this manner, by performing the processing such as a search and the processing such as an integration over the documents in the intermediate code state, the document processing according to the embodiment illustrated in FIG. 19A can reduce the load of I/O, as compared with the processing performed in the uncompressed state of the decompressed document illustrated in FIG. 19B. Consequently, the document processing according to the embodiment can speed up the processing.

Advantageous effects of the information processing device 1 according to the present embodiment will be explained next. The information processing device 1 generates a plurality of intermediate encoded documents, from a plurality of documents, obtained by converting a word included in the intermediate code table 42 into intermediate code based on the intermediate code table 42 in which a plurality of words are associated with an intermediate code group. The information processing device 1 counts the frequency of each of the codes into which the words are converted through the intermediate encoding in the intermediate encoded documents. The information processing device 1 outputs a plurality of optimally encoded documents obtained by converting each of the intermediate encoded documents thereto through the optimal encoding using the result of frequency counts. According to the configuration, the information processing device 1 uses the intermediate code table 42 common to the documents to perform the intermediate encoding and counts the frequency of each intermediate code, and can therefore use the results of the frequency counts, for example, when performing the processing such as a search over the documents.

According to the information processing device 1 of the present embodiment, the integrated total information in which results of frequency counts of the intermediate encoded documents are merged is generated. The information processing device 1 converts each of the intermediate encoded documents into an optimally encoded document through optimal encoding based on the generated integrated total information, and outputs a plurality of optimally encoded documents. According to the configuration, the information processing device 1 can perform optimal encoding by using the integrated total information in which the results of frequency counts of the intermediate encoded documents are merged.

According to the information processing device 1 of the present embodiment, the intermediate code table 42 associates the words with the intermediate code group of a fixed length. The information processing device 1 performs an intermediate encoding on each of a plurality of optimally encoded documents, on which an optimal encoding is performed, based on the intermediate code table 42. According to the configuration, the information processing device 1 performs an intermediate encoding with a fixed length on each of the documents, and can therefore handle a code string, on which the intermediate encoding is performed, as a lexical analysis result.

According to the information processing device 1 of the present embodiment, when an intermediate encoded document including a specific keyword is to be searched for from the intermediate encoded documents, the following processing is performed. The information processing device 1 determines the intermediate encoded document including the specific keyword from the intermediate encoded documents on which the intermediate encoding is performed, based on the results of frequency counts of the respective intermediate encoded documents. The information processing device 1 searches for the code string, on which intermediate encoding is performed, corresponding to the determined intermediate encoded document. According to the configuration, the information processing device 1 can determine the document including the specific keyword from the intermediate code states of the documents by using the results of frequency counts of the respective documents, and can thereby reduce the load of I/O, as compared with the processing performed in the uncompressed state of the decompressed document. Consequently, the information processing device 1 can speed up the document processing.

According to the information processing device 1 of the present embodiment, when the first keyword in the intermediate encoded documents is to be replaced with the second keyword, the intermediate encoded document including the first keyword is determined based on the results of frequency counts of the respective intermediate encoded documents. The information processing device 1 replaces the intermediate code of the first keyword with the intermediate code of the second keyword for the code string, on which the intermediate encoding is performed, corresponding to the determined intermediate encoded document. According to the configuration, the information processing device 1 replaces keywords from the intermediate code states of the documents, and can thereby reduce the load of I/O, as compared with the processing performed in the uncompressed state of the decompressed document. Consequently, the information processing device 1 can speed up the document processing.

According to the information processing device 1 of the present embodiment, the code strings of the intermediate encoded documents searched by the searching processing or the code strings of the intermediate encoded documents replaced by the replacing processing are integrated. The information processing device 1 updates the results of frequency counts in the intermediate encoded documents including the integrated intermediate encoded document. According to the configuration, the information processing device 1 integrates the documents as document processing targets in the intermediate code state and updates the results of frequency counts while remaining in the intermediate code state, so that the document processing can be speeded up.

Hardware Configuration of Information Processing Device

Figure 20:
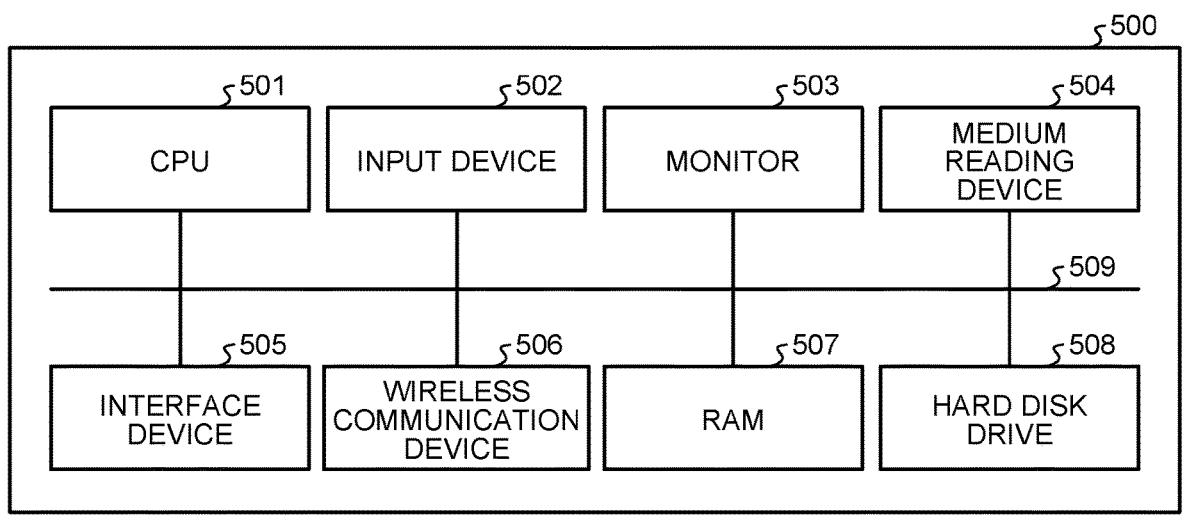
FIG. 20 is a diagram of an example of a hardware configuration of the information processing device.

FIG. 20 is a diagram of an example of a hardware configuration of the information processing device. As illustrated in FIG. 20, a computer 500 includes a central processing unit (CPU) 501 that executes various operations, an input device 502 that accepts data input from the user, and a monitor 503. The computer 500 also includes a medium reading device 504 that reads a program or the like from a storage medium, an interface device 505 for connection with other devices, and a wireless communication device 506 for wireless connection with other devices. The computer 500 further includes a random access memory (RAM) 507 that temporarily stores various pieces of information, and a hard disk drive 508. The devices 501 to 508 are connected to a bus 509.

The hard disk drive 508 stores a document processing program having the same functions as the compression unit 10, the document processing control unit 20, and the decompression unit 30 illustrated in FIG. 4. The hard disk drive 508 also stores various data for implementing the document processing program. The various data include the data stored in the storage unit 40 illustrated in FIG. 4.

The CPU 501 reads the programs stored in the hard disk drive 508 and loads them into the RAM 507, to thereby perform various processing. These programs allow the computer 500 to function as the function units illustrated in FIG. 4.

The document processing program does not have to be stored in the hard disk drive 508. For example, it may be configured so that the computer 500 reads the program stored in a storage medium that can be read by the computer 500 and executes the program. The recording medium that can be read by the computer 500 corresponds to, for example, a portable recording medium such as compact disk read only memory (CD-ROM) and digital versatile disk (DVD), and Universal Serial Bus (USB) memory, a semiconductor memory such as a flash memory, and a hard disk drive. It may also be configured so that the program is stored in a device connected to a public line, the Internet, a local area network (LAN), or the like and the computer 500 reads the program through any one of them to be executed.

According to one embodiment of the present invention, when processing such as search processing over a plurality of documents is to be performed, a plurality of total results generated at the time of compression can be used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein an encoding program that causes a computer to execute a process comprising:
    first generating first encoding information, in which a plurality of words divided by using a static word dictionary and a first code group of a fixed length are associated, based on a plurality of documents;
    second generating second encoding information, in which the plurality of words and a second code group of a variable length are associated, based on a results of frequency counts of the plurality of words;
    encoding a plurality of second encoded documents that is compressed by a variable length code into a plurality of first encoded documents based on the first encoding information and the second encoding information by encoding the second code group in the plurality of second encoded documents into the first code group in the plurality of first encoded documents;
    determining a first encoded document that includes a first keyword from the plurality of first encoded documents based on the results of frequency counts of the plurality of words;
    retrieving the first encoding information corresponding to the first keyword from the plurality of first encoded documents; and
    outputting the plurality of first encoded documents encoded.

2. The non-transitory computer-readable recording medium according to claim 1, wherein the process further comprises
    replacing the first encoding information corresponding to the first keyword into the first encoding information corresponding to a second keyword for the first encoded documents determined.

3. The non-transitory computer-readable recording medium according to claim 1, wherein the process further comprises:
    third generating the first encoded documents by encoding the plurality of words included in the first encoding information from the plurality of documents; and
    storing the plurality of second encoded documents in which the plurality of first encoded documents by the variable length code respectively.

4. An information processing apparatus comprising:
    a processor, the processor executes:
        first generating first encoding information, in which a plurality of words divided by using a static word dictionary and a first code group of a fixed length are associated, based on a plurality of documents;
        second generating second encoding information, in which the plurality of words and a second code group of a variable length are associated, based on a results of frequency counts of the plurality of words;
        encoding a plurality of second encoded documents that is compressed by a variable length code into a plurality of first encoded documents based on the first encoding information and the second encoding information by encoding the second code group in the plurality of second encoded documents into the first code group in the plurality of first encoded documents;
        determining a first encoded document that includes a first keyword from the plurality of first encoded documents based on the results of frequency counts of the plurality of words;
        retrieving the first encoding information corresponding to the first keyword from the plurality of first encoded documents; and
        outputting the plurality of first encoded documents encoded.

5. A document processing method executed by a computer, the method comprising:
    first generating first encoding information, in which a plurality of words divided by using a static word dictionary and a first code group of a fixed length are associated, based on a plurality of documents;
    second generating second encoding information, in which the plurality of words and a second code group of a variable length are associated, based on a results of frequency counts of the plurality of words;
    encoding a plurality of second encoded documents that is compressed by a variable length code into a plurality of first encoded documents based on the first encoding information and the second encoding information by encoding the second code group in the plurality of second encoded documents into the first code group in the plurality of first encoded documents;
    determining a first encoded document that includes a first keyword from the plurality of first encoded documents based on the results of frequency counts of the plurality of words;
    retrieving the first encoding information corresponding to the first keyword from the plurality of first encoded documents; and
    outputting the plurality of first encoded documents encoded.

* * * * *